US012124890B2

(12) United States Patent
Mueller et al.

(10) Patent No.: US 12,124,890 B2
(45) Date of Patent: Oct. 22, 2024

(54) EVENT PROVISIONING FOR HIGH-LEVEL PROGRAMING LANGUAGE PLATFORM

(71) Applicant: SAP SE, Walldorf (DE)

(72) Inventors: Martin Mueller, Walldorf (DE); Andre Pany, Bad Friedrichshall (DE); Thomas Ehret, Leimen (DE); Raphael Dibbern, Oftersheim (DE); Jonas Braun, Heidelberg (DE); Roland Trapp, Speyer (DE); Ihlas Basha, Karlsruhe (DE); Nadine Baumgaertel, Altlussheim (DE); Vanessa Rau, Heidelberg (DE); Silvana Straus, St. Leon-Rot (DE); Tatjana Pfeifer, Altrip (DE); Jens Roessler, Wiesloch (DE); Roman Belosludtsev, Neulussheim (DE); Arne Rantzen, Ketsch (DE); Jes Sie Cheah, Bammental (DE)

(73) Assignee: SAP SE, Walldorf (DE)

( * ) Notice: Subject to any disclaimer, the term of this patent is extended or adjusted under 35 U.S.C. 154(b) by 181 days.

(21) Appl. No.: 17/873,736

(22) Filed: Jul. 26, 2022

(65) Prior Publication Data

US 2024/0036946 A1 Feb. 1, 2024

(51) Int. Cl.
G06F 9/54 (2006.01)
(52) U.S. Cl.
CPC .................... G06F 9/542 (2013.01)
(58) Field of Classification Search
CPC ...................................... G06F 9/542
See application file for complete search history.

(56) References Cited

U.S. PATENT DOCUMENTS

| 2007/0121631 A1* | 5/2007 | Krikorian | H04L 45/302 370/392 |
| 2007/0143770 A1* | 6/2007 | Kaler | G06F 9/546 719/313 |
| 2013/0152090 A1* | 6/2013 | Balko | G06F 9/52 718/102 |
| 2013/0182700 A1* | 7/2013 | Figura | H04L 43/04 709/224 |
| 2013/0345999 A1* | 12/2013 | Hafen | G01R 19/2513 702/60 |

(Continued)

Primary Examiner — Tuan C Dao
(74) Attorney, Agent, or Firm — Buckley, Maschoff & Talwalkar LLC

(57) ABSTRACT

Embodiments may facilitate event processing for an ABAP platform. A business object data store may include a RAP model, including a behavior definition, for a business object. A framework may automatically transform the behavior definition of the RAP model into a producer event via an event binding and a cloud event standardized format. Information about the producer event may then be passed to an ABAP application associated with a pre-configured destination at an enterprise business technology platform. In some embodiments, a standalone API enterprise hub data store may contain an event specification. An ABAP development tenant of a business technology platform may automatically parse the event specification and translate the parsed information into high-level programming language structures that reflect an event type at runtime. An event consumption model may then be generated based on the event type.

27 Claims, 39 Drawing Sheets

(56) References Cited

U.S. PATENT DOCUMENTS

| | | | |
|---|---|---|---|
| 2014/0201729 A1* | 7/2014 | Smith | G06F 8/38 |
| | | | 717/173 |
| 2016/0182652 A1* | 6/2016 | Bevilacqua | G06F 9/546 |
| | | | 709/203 |
| 2017/0017368 A1* | 1/2017 | Maheshwari | H04L 41/22 |
| 2017/0235537 A1* | 8/2017 | Liu | G06F 3/1454 |
| | | | 715/759 |
| 2018/0101585 A1* | 4/2018 | Curtis | G06F 16/258 |
| 2018/0113800 A1* | 4/2018 | Bhageria | G06F 3/0416 |
| 2019/0102411 A1* | 4/2019 | Hung | G06N 5/025 |
| 2019/0132276 A1* | 5/2019 | Scheiber | H04L 67/12 |
| 2020/0028890 A1* | 1/2020 | White | H04L 61/5007 |
| 2021/0019194 A1* | 1/2021 | Bahl | H04L 67/1031 |
| 2022/0138691 A1* | 5/2022 | Dickinson | G06Q 30/0201 |
| | | | 705/301 |

* cited by examiner

2300

DATA:    lo_topic_docu type ref to /iwxbe/if_docu_topic,
         lo_descr_docu type ref to /iwxbe/if_docu_description.

" Set documentation for conversion summary
lo_descr_docu ?= io_description.
lo_descr_docu->set_title_as_string( 'This is a description title' ).

" Set documentation for conversion summary
lo_topic_docu ?= io_description->create_topic( 'EventDocu' ).
lo_topic_docu->set_summary(      iv_id = 'TX'
                                 iv_object = '/IWXBE/TX_SUMMARY_CONVERSION' ).

lo_topic_docu->set_description( iv_id = 'TX'
                                 iv_object = '/IWXBE/TX_DESCR_CONVERSION' ).

lo_topic_docu->set_description_as_ktd( iv_type = 'DEVC'
                                        iv_name = '/IWXBE/TEST_SAMPLES' ).

lo_topic_docu->set_additional_property( iv_key = 'UnitConversion'
                                         iv_value = 'enabled' ).

lo_topic_docu->set_shorttext_as_ktd( iv_type = 'DEVC'
                                      iv_name = '/IWXBE/TEST_SAMPLES' ).

AsyncAPI 2.0

Info 2412

Servers (Hosts + Security) 2422

Channel 2432
- Channel Item
  - Operation (Publish and Subscribe)
    - Summary, description, tags, *etc.*
    - Message
      - Headers
      - Payload Components 2442
- Schemas
- Messages
- Traits

- /iwxbe/if_async_api_reader_v20
  - /iwxbe/if_async_v20_channel
  - /iwxbe/if_async_v20_message
    - /iwxbe/if_async_v20_header
      - /iwxbe/if_async_v20_property
  - /iwxbe/if_async_v20_schema
    - /iwxbe/if_async_v20_property
      - /iwxbe/if_async_v20_schema_itm

*FIG. 26*

Async-API JSON
```
{
 "asyncapi": "2.0.0",
 "x-sap-catalog-spec-version": "1.0",
 "info": {
 "title": "Test AsyncAPI",
  "version": "1.0",
  "description": "Message traits are not included."
 },
 "channels": {
  "ce/sap/eee/zardeprod/v1/Event/Error/v1": { "subscribe": { "message": { "$ref":
  "#/components/messages/sap_eee_zardeprod_v1_Event_Error_v1" } } }
 },
 "components": {
  "messages": {
   "sap_eee_zardeprod_v1_Event_Error_v1": {
    "name": "sap.eee.zardeprod.v1.Event.Error.v1",
    "summary": "Test Summary.",
     "headers": {
       "properties": {
       "type": { "const": "sap.eee.zardeprod.v1.Event.Error.v1" },
       "source": { "const": "/default/sap.eee/G1YCLNT400" },
       "datacontenttype": { "const": "application/json" },
       "xsapcompcode": { "type": "string" }
      }
     },
     "payload": { "$ref": "#/components/schemas/sap_eee_zardeprod_v1_Event_Error_v1" },
"traits": [ { "$ref": "#/components/messageTraits/CloudEventContext" } ]
    }
   },
   "schemas": {
    "sap_eee_zardeprod_v1_Event_Error_v1": {
     "type": "object",
     "properties": {
      "Message": { "type": "string" },
      "Code": {
       "type": "integer",
        "format": "int32"
      }
     }
    }
   },
   "messageTraits": {}
 }
}
```
— 2800

*FIG. 28*

```
        }
        Converted ABAP structure
        (
                DESCRIPTOR_CLASS_NAME = '/IWXBE/CL_GENERIC_CONS_DESCRIP'
                EXTENSION_CLASS_NAME = 'Z_CL_CG_CONSUMER_EXT'
                CONSUMER_CLASS_NAME = 'Z_CL_CG_CONSUMER'
                HANDLER_INTERFACE_NAME = 'Z_IF_CG_HANDLER'
                ABSTRACT_ENTITIES = (
                  (
                    NAME = 'Z_EVENT_ERROR_V1'
                    EVENT_DESCRIPTION = ''
                    EVENT_TYPE = 'sap.eee.zardeprod.v1.Event.Error.v1'
                    DATA_SCHEMA = 'sap_eee_zardeprod_v1_Event_Error_v1'
                    GENERATION_ORDER = 0
                    IS_ROOT = 'X'
                    ELEMENTS = (
                    (
                            FIELD_NAME = 'Message'
                            EXTERNAL_NAME = 'Message'
                            DESCRIPTION = ''
                            IS_PRIMITIVE = 'X'
                            IS_COLLECTION = ''
                            FIELD_CONTENT = (
                              XCO_EXPRESSION = {}
                              XCO_TYPE = {}
                              XCO_ASSOCIATION = (
                                 TARGET = ''
                                 XCO_CARDINALITY = {}
                                 XCO_CONDITION = {}
                              )
                              PROPERTY_TYPE = STRING|0
                            )
                    )
                    (
                            FIELD_NAME = 'Code'
                            EXTERNAL_NAME = 'Code'
                            DESCRIPTION = ''
                            IS_PRIMITIVE = 'X'
                            IS_COLLECTION = ''
                            FIELD_CONTENT = (
                              XCO_EXPRESSION = {}
                              XCO_TYPE = {}
                              XCO_ASSOCIATION = (
                                 TARGET = ''
                                 XCO_CARDINALITY = {}
                                 XCO_CONDITION = {}
                              )
                              PROPERTY_TYPE = INT32|11
                            )
                    ) )
                )
                EVENT_TYPES = (
                    (
                            TYPE                = 'sap.eee.zardeprod.v1.Event.Error.v1'
                            HANDLE_METHOD_NAME  = 'handle_event_error_v1'
                            EVENT_INTERFACE_NAME= 'Z_IF_EVENT_ERROR_V1'
                            LOCAL_CLASS_NAME    = 'EVENT_ERROR_V1'
                            ABSTRACT_ENTITY_NAME= 'Z_EVENT_ERROR_V1'
                    )
                )
```

EVENT PROVISIONING FOR HIGH-LEVEL PROGRAMING LANGUAGE PLATFORM

BACKGROUND

In an event-driven architecture, an application may create events when certain conditions are satisfied. For example, a first enterprise application might generate an event when a manager's address is updated. Moreover, an event consumer might perform particular actions when an event occurs. For example, a second enterprise application responsible for sending reminders to employees and their managers might update a communication table when it detects that a "manager address update" event has occurred. An event-driven architecture is "loosely coupled" in that an event provider does not needs to know about what actions will be triggered by any specific event. As a result, new abilities can be easily added to a systems without needing to update event providers.

In some cases, the applications associated with an event driven architecture may utilize a high-level business programming language such as the Advanced Enterprise application Programming ("ABAP") language. Manually creating event providers and consumers for such applications, however, can be a time consuming and error-prone task—especially when a substantial number of events or applications are involved. It would be desirable to perform event processing for a high-level programing language platform in a secure and efficient manner.

SUMMARY

Methods and systems may facilitate event processing for a high-level programing language platform. In particular, some embodiments may facilitate event processing for an ABAP platform. A business object data store may include a RAP model, including a behavior definition, for a business object. A framework may automatically transform the behavior definition of the RAP model into a producer event via an event binding and a cloud event standardized format. Information about the producer event may then be passed to an ABAP application associated with a pre-configured destination at an enterprise business technology platform. In some embodiments, an API standalone enterprise hub data store may contain an event specification. An ABAP development tenant of a business technology platform may automatically parse the event specification and translate the parsed information into high-level programming language structures that reflect an event type at runtime. An event consumption model may then be generated based on the event type.

Some embodiments comprise: means for accessing, by an Enterprise Event Enablement ("EEE") framework from a business object data store, a behavior definition of a Representational State Transfer ("REST")ful Application Programming ("RAP") model for a business object, wherein the business object data store contains electronic records that include a RAP model for a business object, wherein the RAP model has a behavior definition; means for automatically transforming the behavior definition of the RAP model into a producer event via an event binding and a cloud event standardized format; and means for passing information about the producer event to a high-level programming language application associated with a pre-configured destination at an enterprise business technology platform.

Some embodiments comprise: means for accessing, by a high-level programming language development tenant of a business technology platform from a standalone Application Programming Interface ("API") enterprise hub data store, an event specification, wherein the API enterprise hub data store contains electronic records that include the event specification; means for automatically parsing the event specification; means for translating the parsed information into high-level programming language structures that reflect an event type at runtime; and means for generating an event consumption model based on the event type.

Some technical advantages of some embodiments disclosed herein are improved systems and methods to perform event processing for a high-level programing language platform in a secure and efficient manner.

BRIEF DESCRIPTION OF THE DRAWINGS

FIG. 23 is a listing that shows how a descriptor can use a documentation API according to some embodiments.

FIGS. 24A and 24B are structural AsyncAPI overviews in accordance with some embodiments.

FIG. 26 is a transformation result in accordance with some embodiments.

FIG. 28 shows a pre-conversion AsyncAPI JavaScript Object Notation ("JSON") according to some embodiments.

FIG. 29 show a post-conversion ABAP structure in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Overview

Figure 1:
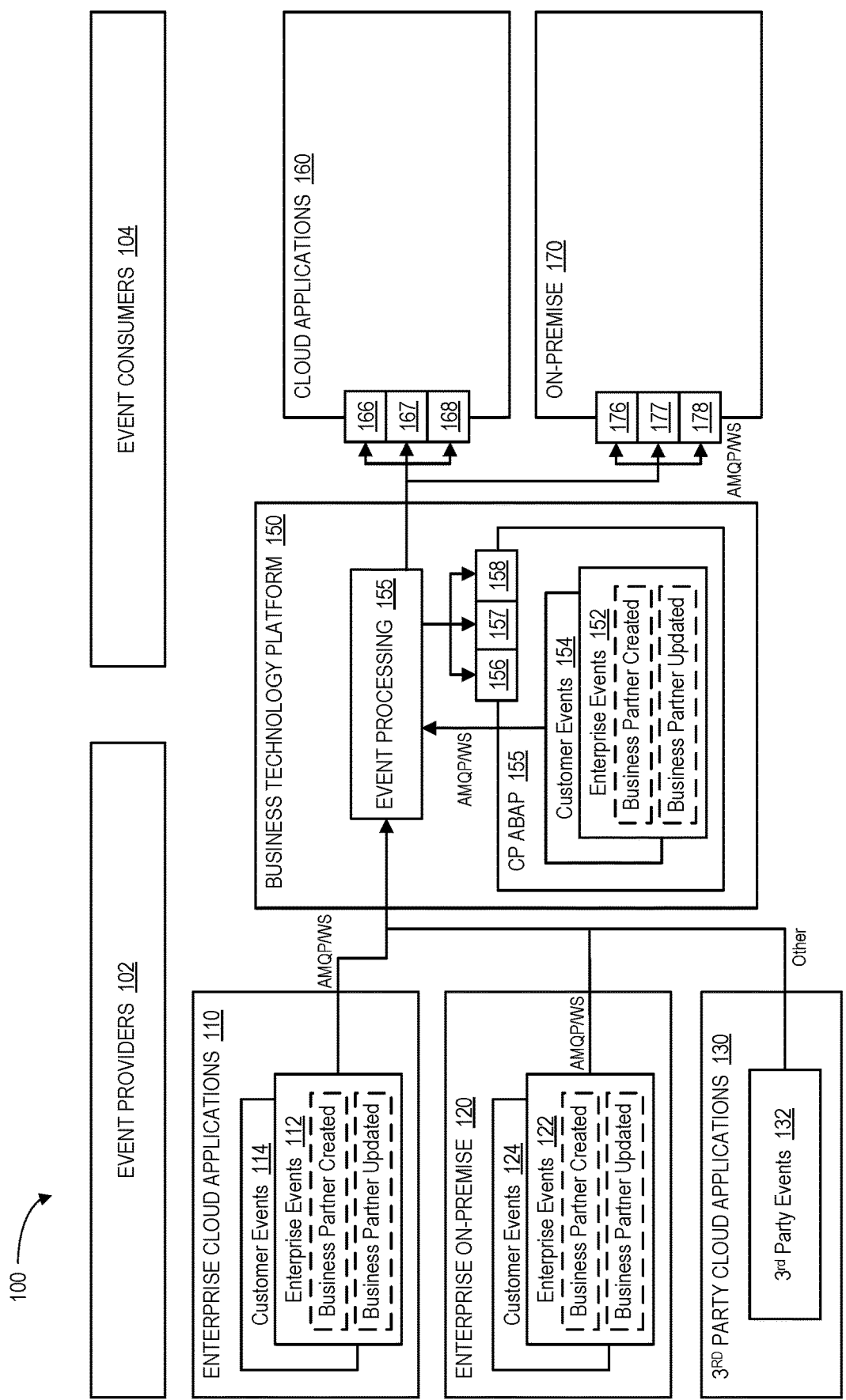
FIG. 1 is a high-level system architecture for an event-based integration scenarios at runtime in accordance with some embodiments.

FIG. 1 is a high-level system 100 architecture for event-based integration scenarios at runtime in accordance with some embodiments. Embodiments are not limited to the FIG. 1 architecture. The system 100 supports event providers 102 and event consumers 104. In particular, enterprise cloud applications 110, on-premise application 120, and third-party cloud applications 130 may comprise event providers 102. For example, the enterprise cloud applications 110 might be associated with a business programs running on an SAP® S/4HANA™ Enterprise Resource Platform ("ERP") cloud environment for large enterprises. These applications may generate enterprise events 112 (e.g., business partner created or business partner updated) and/or customer events 114. In some cases, the events may be transmitted using the Advanced Message Queuing Protocol over WebSocket ("AMQP/WS") protocol. Similarly, the enterprise on-premise applications 120 may generate enterprise events 122 and/or customer events 124 and the third-party cloud applications 130 may generate third-party events 132.

The events may be received by event processing 155 at a business technology platform 150. The business technology platform 150 may include a high-level programming language platform, such as Cloud Platform ("CP") ABAP 155 that generates enterprise events 152 and/or customer events 154. The business technology platform 150 may include interfaces to support customer events 156, third-party events 157, and enterprise events 158. Moreover, the event consumers 104 may be associated with cloud applications 160 (supporting customer, third-party, and enterprise interfaces 166, 167, 168) and on-premise applications 170 (supporting customer, third-party, and enterprise interfaces 176, 177, 178). The event consumers 104 may then automatically respond to events created by the event providers 102 as appropriate. As used herein, the term "automatically" may refer to a device or process that can operate with little or no human interaction.

According to some embodiments, devices, including those associated with the system 100 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores, which may be locally stored or reside remote from various elements. Although a single business technology platform 150 is shown in FIG. 1, any number of such devices may be included. Moreover, various devices described herein might be combined according to embodiments of the present invention. Some or all of the system 100 functions may be performed by a constellation of networked apparatuses, such as in a distributed processing or cloud-based architecture.

An operator or administrator may access the system 100 via a remote device (e.g., a Personal Computer ("PC"), tablet, or smartphone) to view data about and/or manage operational data in accordance with any of the embodiments described herein. In some cases, an interactive graphical user interface display may let the operator or administrator define and/or adjust certain parameters (e.g., to set up or adjust various mapping relationships) and/or provide or receive automatically generated recommendations, results, and/or alerts from the system 100.

Figure 2:
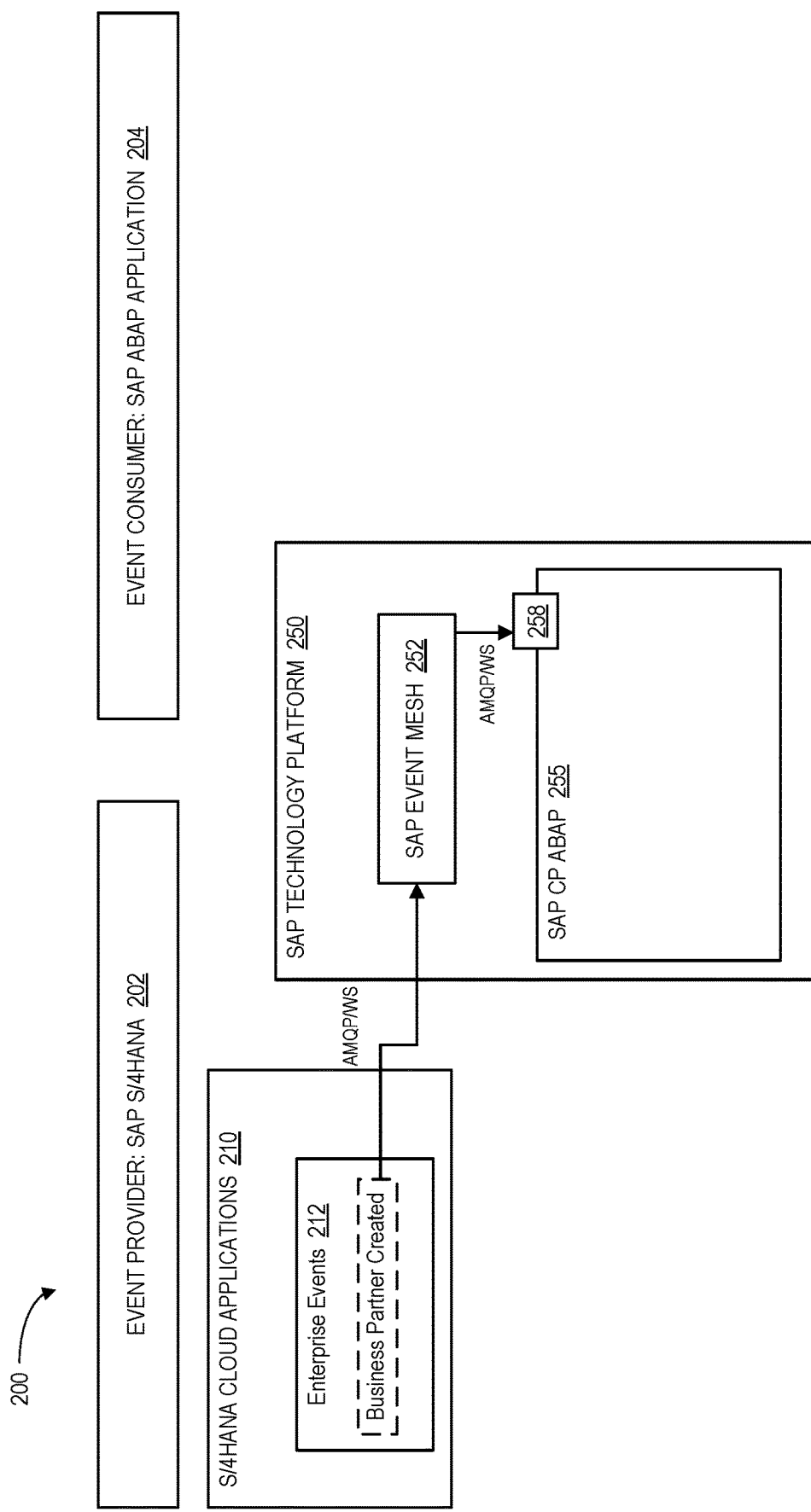
FIG. 2 is an example of an event-based scenario according to some embodiments.

FIG. 2 is an example 200 of an event-based scenario that supports event providers 202 and event consumers 204 according to some embodiments. S/4HANA™ cloud applications 210 generate enterprise events 212 (e.g., business partner created) that are transmitted using AMQP/WS. The events are received by event mech 252 at an SAP® technology platform 250. The business technology platform 250 includes CP ABAP 255 that receives the event via an SAP event interface 258. The event consumers 204 may then automatically respond to events created by the event providers 202 as appropriate.

Figure 3:
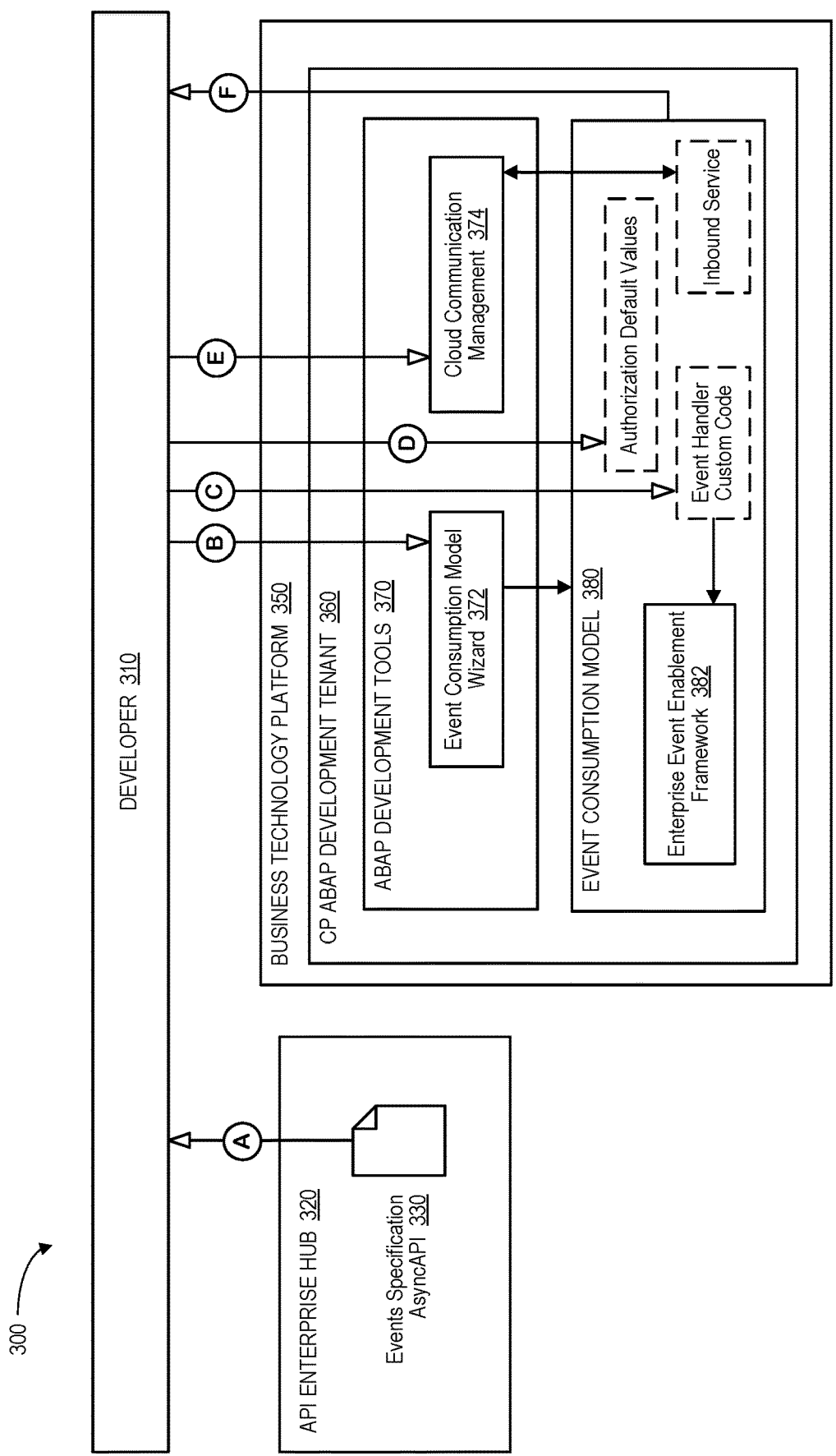
FIG. 3 shows event consumption model generation in accordance with some embodiments.

FIG. 3 shows 300 event consumption model generation in accordance with some embodiments. At (A), a developer 310 may download information from a standalone Application Programming Interface ("API") enterprise hub 320. The downloaded information may be associated with, for example, a protocol agnostic standard to facilitate the definition of interfaces for asynchronous APIs, such as events specification AsyncAPI 330. At (B), the developer 310 may upload the event specification 330 into an event consumption model wizard 372 executing at ABAP development tools 370 of a CP ABAP development tenant 360 of a business technology platform 350. The developer 310 may run the wizard 372 and implement event handler customer code of an event consumption model at (C). At (D), the developer 310 may define authorization default values and use cloud communication management 374 to define a communication scenario at (E) (resulting in an assignment of a new inbound service for the event consumption model 380). According to some embodiments, the event handler custom code sends an event API to an enterprise event enablement framework 382 associated with a consumable event. At (F), the developer 310 may transport the event consumption model 380 and communication scenario to a productive tenant.

Figure 4:
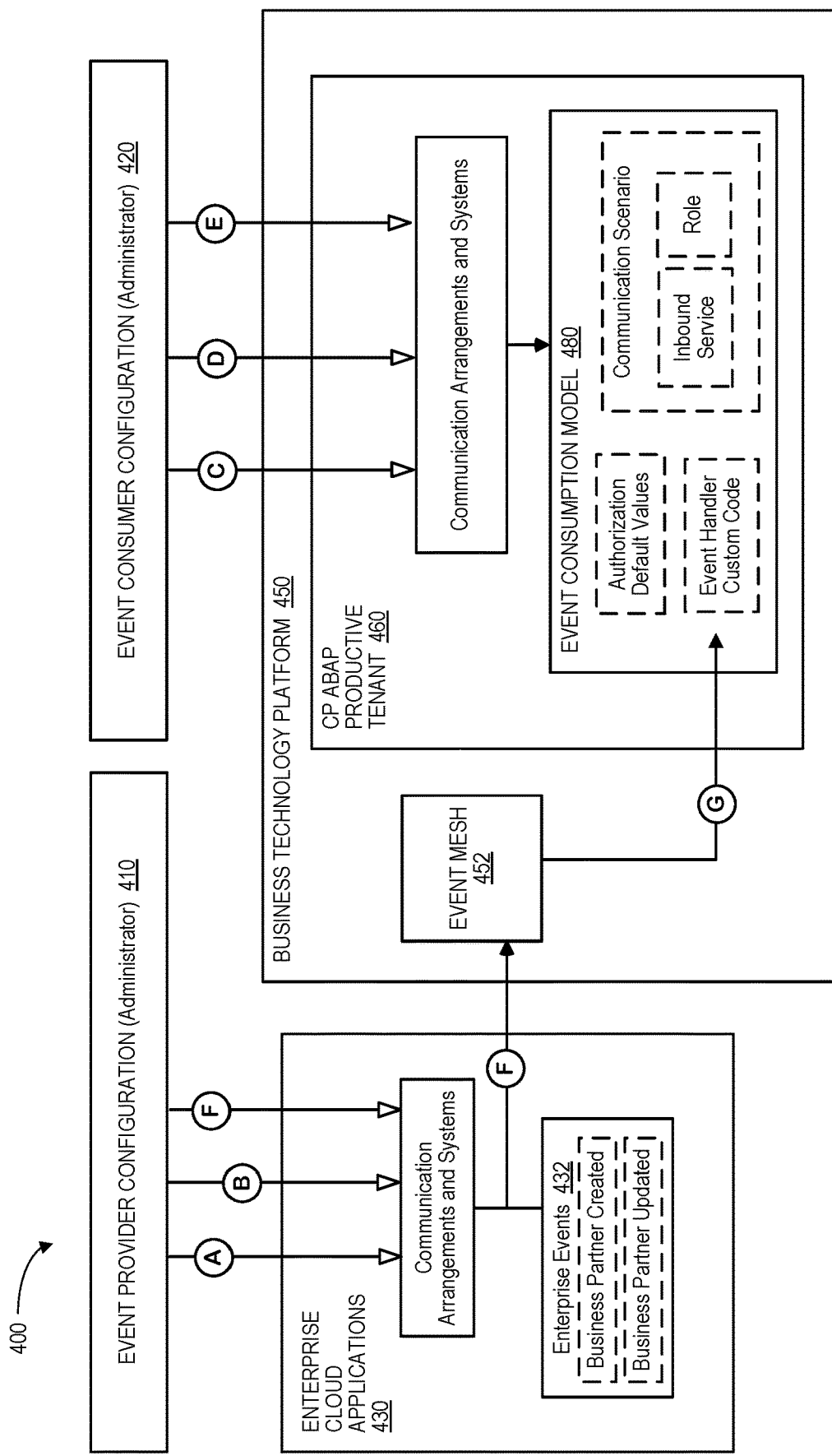
FIG. 4 shows event consumption model configuration according to some embodiments.

FIG. 4 shows 400 event consumption model configuration according to some embodiments. At (A), an administrator associated with an event provider configuration 410 may interact with communication arrangements and systems of enterprise cloud applications 430 to setup a connection with an event mesh 452. As used herein, the phrase "event mesh" may refer to a dynamic infrastructure for sending notifications to applications across a distributed environment (e.g., an event representing a change, action, or observation in a system that produces a notification which is sent to other systems that react to the event). The connection setup of the event mesh 452 may include creating a communication scenario for event publishing. At (B), the administrator 410 may configure outbound channel event binding by assigning events to connections.

At (C), an administrator associated with an event consumer configuration 420 may interact with communication arrangements and systems of a CP ABAP productive tenant 460 in a business technology platform 450 to create a communication scenario for event consumption. At (D), the administrator 420 may setup a communication arrangement for a new event consumption model 480. The event consumption model 480 may be associated with, according to some embodiments, authorization default values, event handler custom code, and/or a communication scenario (e.g., an inbound service and role). At (E), the administrator 420 may assign a consumer communication system to the event mesh 452 communication arrangement. At (F), the enterprise cloud applications 430 may trigger an event by executing a relevant application (e.g., "create a new business partner") so that the event is published via the AMQP/WS protocol. This may result in the event mesh 452 sending the consumable event to the event consumption model 480 (e.g., via the event handler custom code).

Thus, embodiments may facilitate the (1) provisioning and (2) consumption of events for an enterprise. These functions will now be described in more detail.

Event Provisioning

Figure 5:
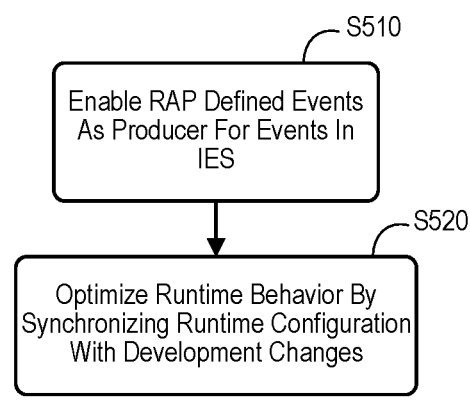
FIG. 5 is an event provisioning method in accordance with some embodiments.

FIG. 5 is an event provisioning method in accordance with some embodiments. At S510, a system may enable Representational State Transfer ("REST")ful Application Programming ("RAP") defined events as producer for events in an Intelligent Enterprise Suite ("IES"). As used herein, the phrase IES may refer to tools that help an intelligent, sustainable enterprise consistently apply advanced technologies and best practices within agile, integrated business processes (e.g., to understand what's happening across a business and why). At S520, the system may optimize runtime behavior by synchronizing runtime configuration with development changes.

Figure 6A:
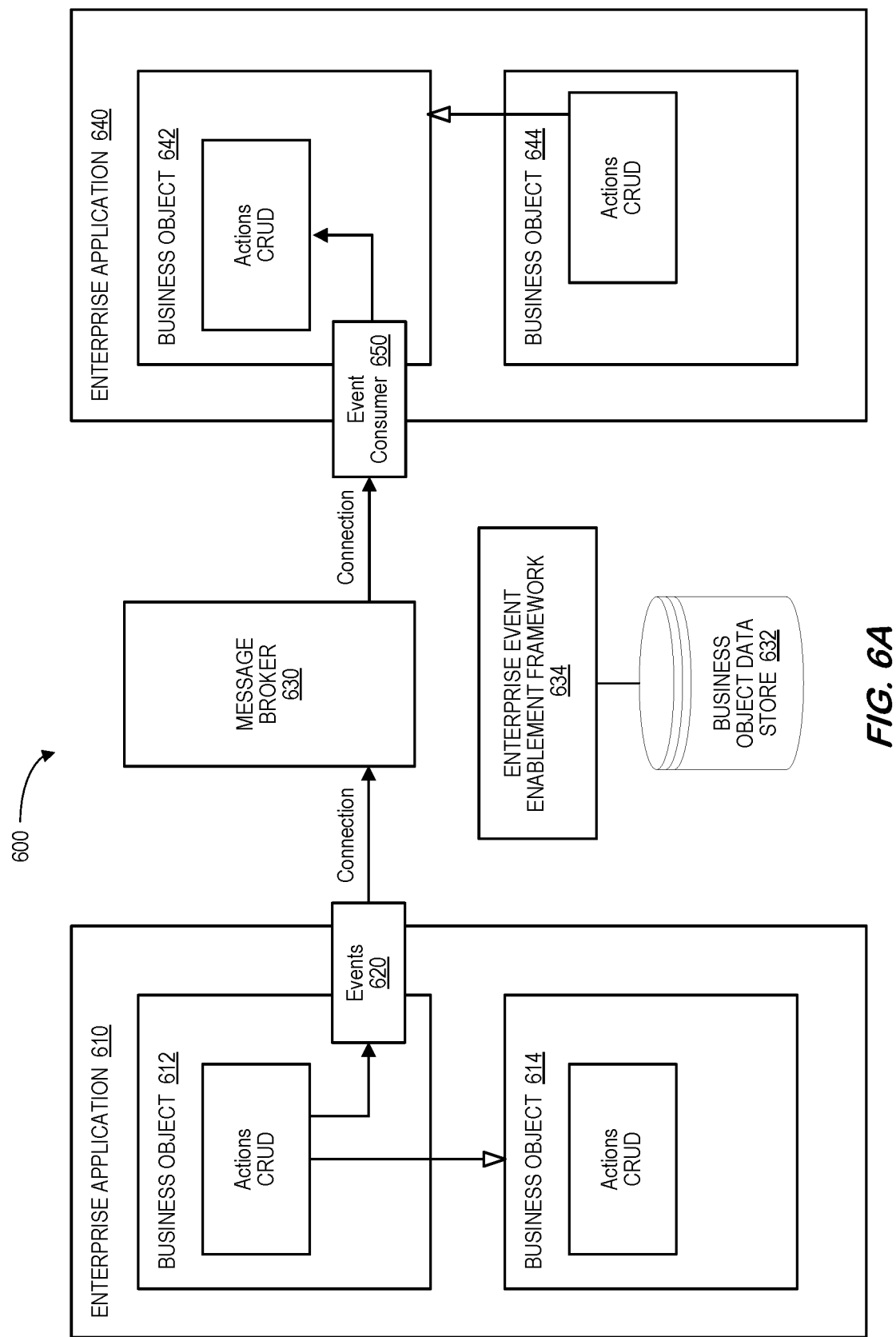
FIG. 6A shows definition of ABAP RESTful Application Programming ("RAP") model events as a producer of events in an Intelligent Enterprise Suite ("IES") according to some embodiments.

FIG. 6A shows 600 the definition of ABAP RAP model events as a producer of events in an IES according to some embodiments. An enterprise application 610 may include one business object 612 that communicates with another business object 614 via actions, such as Create, Read, Update, and Delete ("CRUD") actions. According to some embodiments, the CRUDS actions may automatically use event binding to generate events 620 that are provided to a message broker 630 (e.g., associated with an event mesh) via a connection. The message broker 630 uses another connection with a different enterprise application 640 via an event consumer 650. The different enterprise application 640 may also have business objects 642, 644 that communicate via CRUD actions (e.g., responsive to a received event). According to some embodiments, a business object data store 632 may contain electronic records that include a RAP model for a business object (including a RAP model has a behavior definition). An Enterprise Event Enablement ("EEE") framework 634, coupled to the business object data store 632, may automatically transform the behavior definition of the RAP model into a producer event via an event binding and a cloud event standardized format. Moreover, the EEE framework 634 may pass information about the producer event to a high-level programming language application associated with a pre-configured destination at an enterprise business technology platform.

Figure 6B:
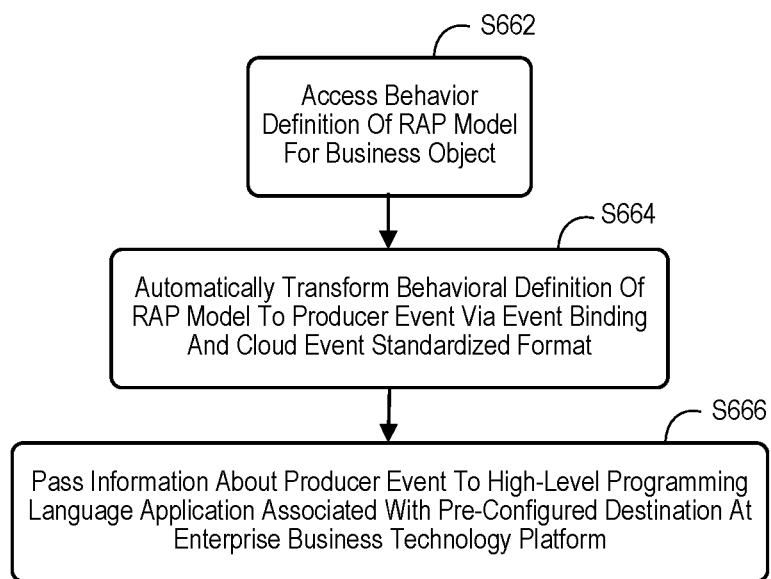
FIG. 6B illustrates a method to define ABAP RAP model events as a producer of events in an IES in accordance with some embodiments.

FIG. 6B illustrates a method to define ABAP RAP model events as a producer of events in an IES in accordance with some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store instructions that when executed by a machine result in performance according to any of the embodiments described herein.

At S662, an Enterprise Event Enablement ("EEE") framework may access, from a business object data store, a behavior definition of a RAP model for a business object. The business object data store may, according to some embodiments, contain electronic records that include a RAP model for a business object (and the RAP model may have a behavior definition). At S664, the system may automatically transform the behavior definition of the RAP model into a producer event via an event binding and a cloud event standardized format. It can then pass information about the producer event to a high-level programming (e.g., ABAP) language application associated with a pre-configured destination at an enterprise business technology platform at S666.

Figure 6C:
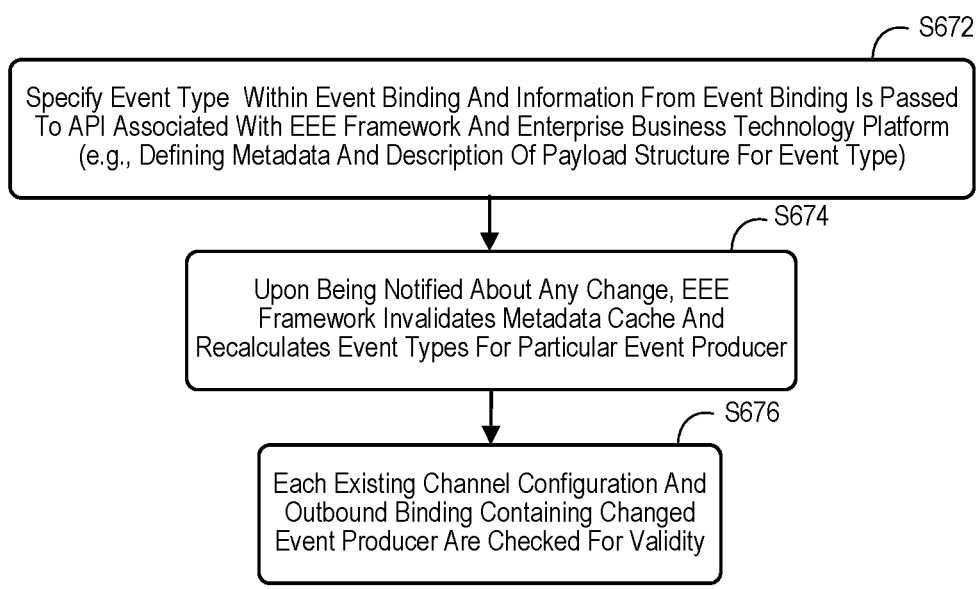
FIG. 6C illustrates a method to optimize runtime behavior according to some embodiments.

FIG. 6C illustrates a method to optimize runtime behavior according to some embodiments. At S672, the system may specify event type within an event binding and the information from the event binding may be passed to an API associated with an EEE framework and an enterprise business technology platform (e.g., defining metadata and a description of payload structure for event type). At S 674, upon being notified about any change, the EEE framework may invalidate a metadata cache and recalculate event types for a particular event producer. At 676, each existing channel configuration and outbound binding containing changed event producer may be checked for validity.

Enable RAP Defined Events as Producer for Events in IES

Within the RAP model, events may be defined using behavior definitions as part of business objects. Customers may, for example, use these events as events in high-level programming language platform (e.g., an ABAP platform) based products to integrate different business processes across different IES products using event-based patterns. Hence, a mapping between the RAP representation of an event for a business object and its external representation as events (e.g., according to a cloud event standard) may be desired. Moreover, a customer may want to expose the RAP-based event types for consumption through external applications in a standard format.

According to some embodiments, RAP events serve as a producer for events. Therefore, an event binding may be provided as a mediator object. Within the event binding, the event type can be specified following the event specification in accordance with the cloud event standard. It may include, for example, an event name, the event business object, and the event operation. To this event type, a specific RAP event can be assigned that includes a RAP business entity and the event name.

The information from the event binding may then be passed to the API of an Enterprise Event Enablement ("EEE") framework of an ABAP platform. This API may allow for a definition of metadata and a description of the payload structure for the event types defined in RAP. The metadata may be exposed in a standardized format to external applications to let them consume events defined in RAP.

The EEE API may also be used by the RAP model to pass events that have been raised at runtime. The EEE may transform the RAP events to an external standardized format (e.g., cloud events) and transport them to a pre-configured destination at a mesh platform of an enterprise business technology platform (e.g., an SAP® mesh platform). From there, external consumers can subscribe and consume events. Through the event binding (typically RAP), qualities can be attached (e.g., a released state as stable API, documentation, transportability, etc.).

By using such an event binding definition, a clear separation of concerns is achieved: (1) the implementation detail provided by the event definition via behavior definition and (2) representation as event type. Moreover, a RAP-based event provider may be embedded as the native and generic event provider for ABAP-platform based products.

Figure 7:
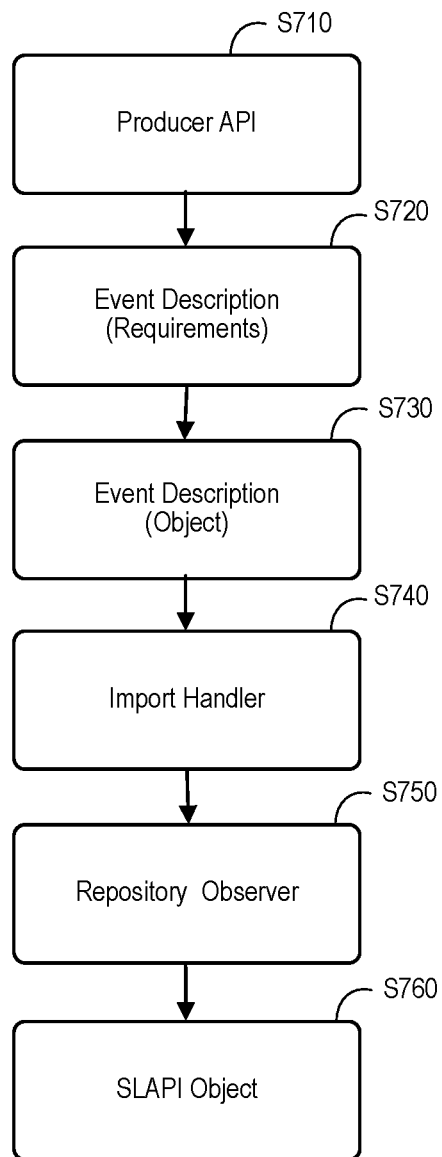
FIG. 7 is an enterprise event enablement method in accordance with some embodiments.

FIG. 7 is an enterprise event enablement method in accordance with some embodiments. To send events from an SAP system to an Enterprise Messaging ("EM") instance in the cloud, embodiments may utilize an event producer and a channel with a connection to the EM. At S710, a producer API may be established. Note that in principle there may be two configuration requirements that need to be satisfied before the system is able to send an event via the channel. The first requirement is a registered producer in a repository (e.g., Event Handling ("BEH") or "DEFAULT"), with a descriptor class that implements the interface. The available event topics and payload types for a respective producer may be defined in the corresponding descriptor class. The second requirement is the creation of the outbound binding for the pre-configured channel. The outbound binding may serve to allow a listing for the customer. The topic of the outbound binding consists of the transformed producer key and the corresponding topic defined in the event descriptor.

According to some embodiments, an event may comprise a "single event" or a "mass event." To create a single event, the system may first create a producer, define the event topic, and eventually establish the event with corresponding business data. These steps are now described in more detail.

The producer may be created using a unique producer key, which contains the information about the repository ID, the producer ID and the producer version. Next, an event topic may be built segment-by-segment. The producer creates the topic object by referring to a first topic segment. It must be a valid topic that is defined in the corresponding descriptor. If the topic segment is invalid, an exception may be thrown. The system can then obtain the complete topic by adding topic segments on the newly created topic object.

After the complete topic is built, the event may be created by the topic object. If the topic expects no payload, the event may be sent directly without setting the business data. If the topic expects a payload, the business data may be set before the event is sent. During the setting of the event payload, an Open Data ("OData") protocol structure facade may create the data container and converts the business data as appropriate. As used herein, the term "OData" may refer to a standard that defines best practices for building and consuming REST APIs to create REST-based services (letting resources identified using URLs and defined in a data model be published and edited by web clients via simple HTTP messages). If something goes wrong during the conversion, an exception may be thrown.

Figure 8:
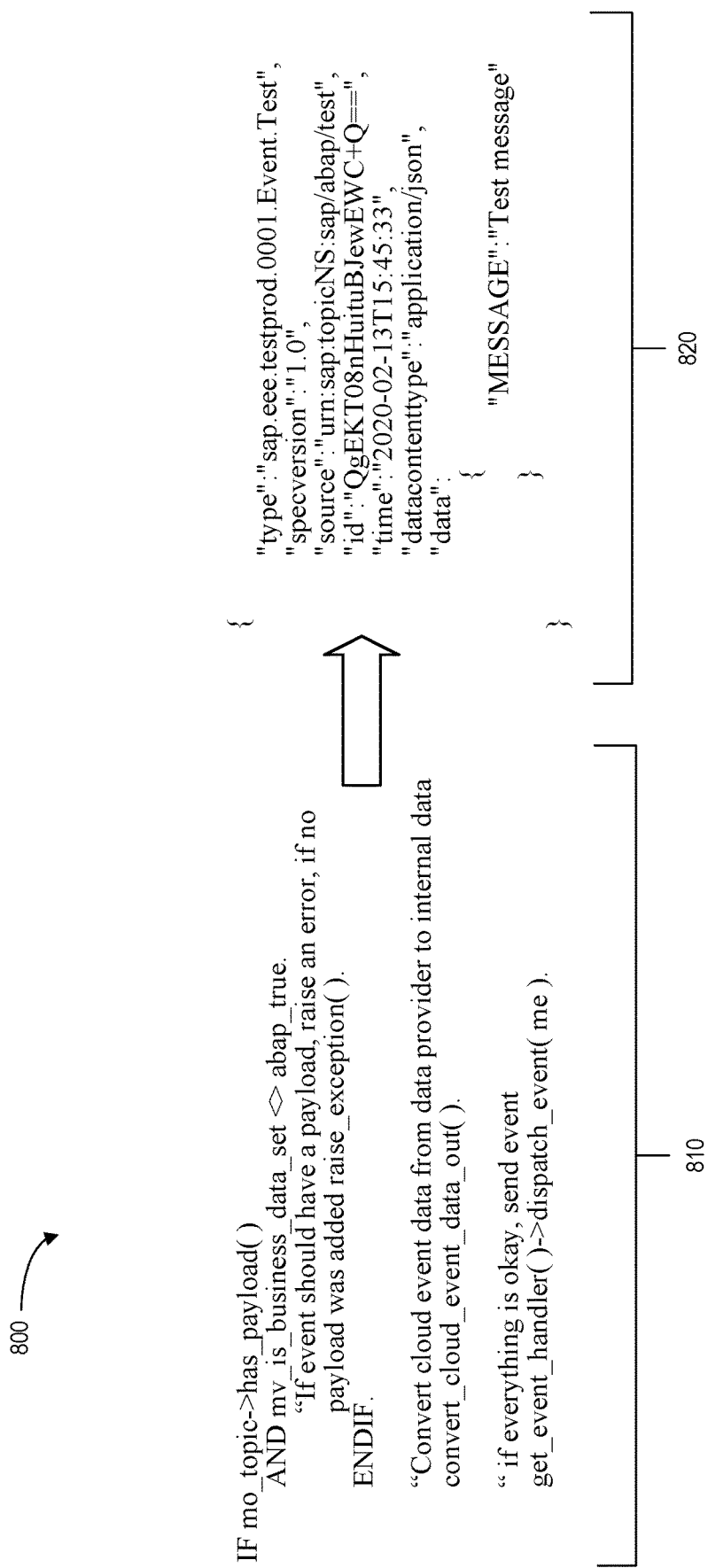
FIG. 8 illustrates event send programming according to some embodiments.

The event may then be sent to the event handler. Before it is dispatched to the respective channels where the event topic matches the outbound binding of the channel, the event object is converted to the event persistency structure and the corresponding cloud envelope for the Cloud Native Computing Foundation ("CNCF") Cloud Event Standard v1.0 is created as a JSON. FIG. 8 illustrates event send programming 800 according to some embodiments. The programming 800 shows an event object 810 prior to conversion. Besides general information relevant to the event, it contains the business data that is serialized as JSON by the OData facade 820. In the programming, "type" denotes the topic string given as in the outbound binding, "specversion" defines the version of the Cloud Event Standard, and "source represents" the valid topic space of the EM instance that has to match the topic space of the channel. Moreover, "id" is a randomly generated Universally Unique Identifier ("UUID"), "times" denotes the time stamp of the event, and "datacontenttype" defines the type of the data (e.g., application or JSON). The business data is given in data. After the event is sent, the system may call COMMIT WORK to publish the events on the channels. If no commit is called, a rollback is executed.

In addition to single events, embodiments may support mass events. For example, RAP often deals not with single business data but a list of business data for the same business object. A mass event is convenient as the event type/cloud event envelope does not change (only the business data and payload). In addition to the requirements mentioned for single events, mass events also require a payload (otherwise it would send out identical events). Additionally, a list of business data is required, and the business data needs to be set before the system can send out mass events. As before, the system creates a producer, the event topic, and eventually the event with corresponding business data. These steps are now described in more detail.

The producer is created using its unique producer key, which contains the information about the repository ID, the producer ID and the producer version. To create a mass event object, a method of an interface may be used to create the event by the topic and description. This is similar to the process for single events, but the returning object is casted into a mass event instead of a single event. After the complete topic is built, the event is created by the topic object.

Referring again to FIG. 7, at S720 event description requirements may be provided. The main requirement is to enable a platform, such as S/4 HANA, to consume and produce events with one aligned representation independent from the used protocol (e.g., HTTP, Message Queuing Telemetry Transport ("MQTT") or AMQP). ODataV4 is one standard that may be used for serializing and deserializing of business data of the cloud event. As a cloud event does not predetermine any specific payload format, embodiments may utilize the ODataV4 specification (and all incoming and outcoming formats are aligned).

To support this approach, an explicit description/definition of the payload and the underlying structure may be provided so that the conversion (such as alpha or unit of measure) is correctly applied for the business data. The payload description may be determined based on the actual producer or consumer. Every producer or consumer may define the subset of topics and their corresponding payload information. The OData context and APIs which are used behind the scenes may not be familiar to the developer who defines the payload description. For performance reasons, a caching of this description may be considered.

The event descriptor is an instance which implements the interface and, with the help of the description, will be created and stored by the framework. The descriptor serves as a provider for all producer and consumer relevant information for providing a Cloud Event Specification and an OData syntax confirm event. Therefore, two major steps may be provided: (1) the description of the topics and (2) the description of the corresponding types. Within those steps, the description will be enriched with everything which is relevant for a producer and/or consumer (e.g., the complete topic tree and the defined payload structures and/or properties). The description may get its data from two different sources: (1) the EEE relevant event topic information, and (2) the ODataV4 model for gathering the payload information.

Depending on which descriptor is needed, the system may either register the consumer or the producer (or both) descriptors. They are independent from each other as they are separately treated with different keys and identifiers (e.g., a consumer key with a repository identifier, consumer identifier, and version and a producer key with a repository identifier, producer identifier and version). The producer key may be unique within the collection of producers and the same may apply for the consumer key.

According to some embodiments, a producer or consumer references one descriptor. A reusing of the same descriptor class for different producers or consumers is possible. It is also possible to reference to the same descriptor class for different producers.

The descriptor may describe the complete topic tree at once within a method. During design time, the descriptor can build the complete topic tree and their belonging payload types via a description object which is provided by the framework. The description object is enriched with everything relevant for the topics. If the descriptor wants to create a topic with several subtopics, the description object is the starting point for building the topic tree. A create topic method of the description may provide a root node (also referred to as a topic segment) to which a new topic segment can be appended. Moreover, each topic node may be enriched with a reference to a specific payload type. Within the describe topics, a developer may simply reference an identifier or string to a payload type which is going to be created. After the describe topic method is executed, the EEE framework will finalize the description and enriches the description with relevant information. According to some embodiments, this may be done before a cache entry is written (so that there is a performance benefit because calculating the relevant information during runtime can be time consuming).

For further processing, and an OData confirm, de-serializing metadata information for the payload may be performed. Therefore, the payload types referenced on a topic node may be further defined so that the metadata information for each property that is derived. This can be achieved within the describe type method of the descriptor interface. Again, the description object is then enriched with the needed information to fulfill this task. The descriptor may retrieve and then describe every payload type which were described in the previous describe topic method. Once a payload type is received the interface can be further used for binding the payload type object to the corresponding structure. Internally, an ODataV4 complex type object may be created for each payload type. This complex type object is wrapped with event context specific interfaces. So once a binding is done, a delegation to the actual complex type can occur. This delegation and the property retrieval are possible due to the fact the binding automatically generates all of the properties for the associated structure. The gateway framework relevant information and the OData related objects are decoupled and may not be known by the descriptor implementer. Therefore, the gateway relevant objects, such as the usage of complex types and primitive types, etc. is wrapped with event context specific interfaces.

If the developer has retrieved the specific payload property, an enriching with the needed information for the de-serializing (such as conversion exits, reference to the unit or currency code property, or the nullable information) can be performed. In addition, the external representation can also be set.

An ERP platform may require datan events for replication scenarios as they allow for the transport of an entire business object within the payload of the event. In comparison to notification events, a callback to the source of the event is not required to retrieve the data of the business object that has been changed. To be able to define the structure of a complex business object with all its sub-nodes, the developer of the descriptor class may utilize additional APIs to describe the sub-nodes. Therefore, the EEE may rely on the capabilities provided by the gateway framework (which may already support the ODataV4 representation of deeply nested structures). Note that OData differentiates between types such as complex types and primitive types. Structured types are composed of other structured types or primitive types, and every property belongs to one specific type. In addition to the type, another characteristic can be placed at the property which is the cardinality [0, 1, or n]. If the property is flagged as a collection, it will be represented in the payload as an array.

The combination of types and the cardinality facilitates a developer to define every needed deep structure. The definition of such a deep structure may still be described in a method and, as with the previous definition of a payload type, the gateway specific API may continue to be wrapped and disguised.

Referring again to FIG. 7, at S730 an event description object may be provided. The description is the main object for all of the producer or consumer relevant information. This object gathers and holds information that is necessary for the framework to process events. The information about the actual payload structure might not be stored as this is done by the gateway framework. Instead, the description may only store a reference to the associated payload type (e.g., a complex type). Note that the topic filter information might not be filled by the descriptor directly. Furthermore, this may be done while finalizing occurs. According to some embodiments, header information is needed for the caching (because this identifies the producer or consumer associated with the description). In addition, the description data holds the last modified time stamp of the descriptor.

At S740, an import handler may be established. After an import of a changed RAP event producer or a deletion of a RAP event binding, channel event bindings in a Cross Event ("XBE") infrastructure may be adjusted to reflect the producer changes. An API may handle outbound bindings of changed producers. This is done by reading all outbound bindings of a specific producer across all clients from a database. As it is possible that outbound bindings contain wildcards, the system may escape those wildcards in order to be able to compare the event topic of the wildcard with the importing parameter (such that the system only handles outbound bindings of the specified producer that match this topic). For all outbound bindings that match the given conditions, new entries may be created in a client-specific database that includes client, topic identifier, and channel name. By storing the unique topic identifier, embodiments may clearly identify the outbound binding, which is needed for further processing of the changed outbound bindings. The channel name is needed for later use to process the changed outbound bindings for each of the relevant channels.

At S750 a repository observer may be provided to cover two use cases. The first use case is to handle the migration of event bindings from BEH to a RAP repository. As the repository observer is already used to process outbound bindings, this API may also handle the migration. As there could be outbound bindings that contain a wildcard, the system may differentiate between outbound bindings with wildcards and explicit outbound bindings. The second use case is to check RAP outbound bindings for validity. RAP is able to receive transports that could contain changes of a producer (e.g., in the descriptor coding).

This means that the EEE cache of producer descriptions would be invalid, as those changes are currently going unnoticed by EEE. This would implicitly lead to problems regarding the configured outbound bindings and the publishing of events. Consider the following scenario: An outbound channel event binding has been created within a channel outbound binding User Interface ("UI"). This outbound binding contains a wildcard sap/s4/beh/SalesOrder/*. If the provider is changing the descriptor after the binding has been created, a problem can occur.

When an outbound binding with a wildcard has been stored, EEE calculates the event topics that belong to this binding. The outbound binding sap/s4/beh/SalesOrder/* could contain the following event topics: sap/s4/beh/SalesOrder/created; sap/s4/beh/SalesOrder/deleted; and sap/s4/beh/SalesOrder/updated.

Now a callback is triggered which informs the provider that events with the calculated event topics shall be published. In the meantime, the descriptor coding changes and an existing event topics is deleted. After this change, the outbound binding sap/s4/beh/SalesOrder/* would only contain those event topics: sap/s4/beh/SalesOrder/created; and sap/s4/beh/SalesOrder/deleted. This change will be unnoticed by EEE until an event is raised by the provider and the metadata cache is renewed. If that is the case, the mentioned callback will not be triggered and the provider will not send the corresponding event at runtime.

To address this situation, an API may let RAP call and inform EEE when the descriptor coding of a producer has changed. This will be noticed when a new transport arrives on which the descriptor class has been changed. When being notified about changed descriptor coding, EEE may invalidate its metadata cache and recalculate the event topics of the channel outbound binding. If the outbound binding is from the BEH repository, EEE shall proceed with migrating the outbound binding to the RAP repository (including the deletion of the old BEH outbound binding after the migration is completed). Subsequently, the callback to RAP and BEH may be triggered to inform them about the updated metadata (to update the responsible repository). The RAP may also call EEE and avoid the cache mechanism at the same time so that unnecessary database accesses are avoided (and RAP already knows that the cache must be invalid due to changes in the descriptor coding).

Referring again to FIG. 7, at S760 a Scalable Language API ("SLAPI") may be utilized. Because RAP needs to register all used tables of the API, a new SLAPI object may be provided. This object may be created in transaction code SLAPI and contain information about the access type and the lock mode of the used database tables. If the system only wants to read outbound bindings, read-only access and the blocking of write access to this database may be provided. If the system wants to write changed outbound bindings and also read them, read and write access needs to be available. Note that an ERP platform may emit events and connect to an enterprise messaging to exchange those events. Customers may use enterprise messaging to connect to enterprise and third-party products via events. The EEE may apply the cloud events standard for the runtime representation of an event to provide interoperability across services, platforms and systems. According to some embodiments, custom attributes may define event header data specific for applications, (e.g., information regarding country or data privacy). These attributes can later be used for filtering.

Figure 9:
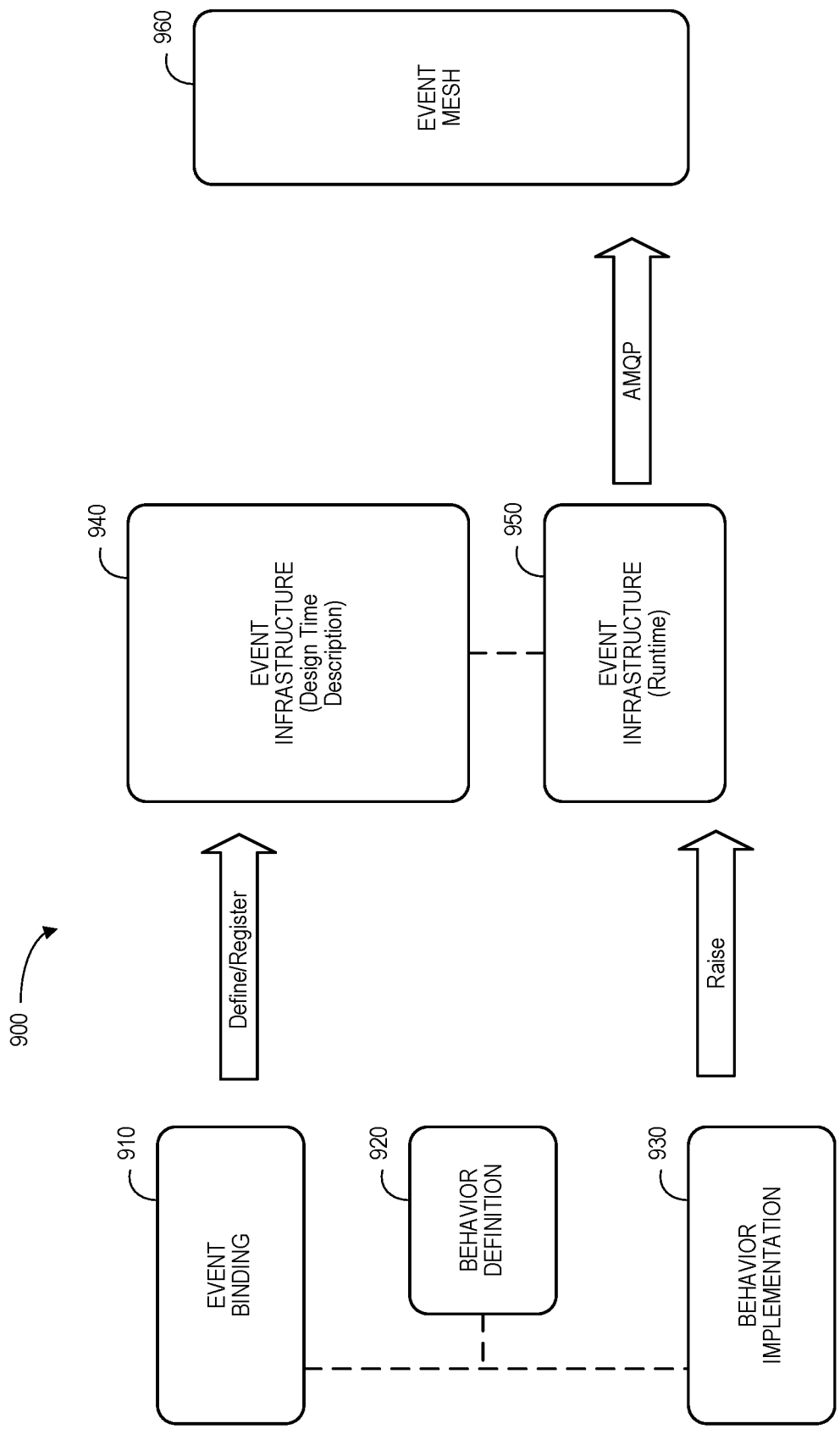
FIG. 9 is an overview of enterprise event enablement in accordance with some embodiments.

FIG. 9 is an overview 900 of enterprise event enablement in accordance with some embodiments. An event binding 910 may be associated with external definitions (e.g., namespace, business object, operation, version, etc.) and RAP references (e.g., a root entry and event), and a behavior definition 920 may be associated with a RAP design time (e.g., a behavior definition and event). A behavior implementation 930 may be associated with a RAP business object runtime (e.g., to raise an entity event). The event binding 910 may define and/or register as appropriate with an event infrastructure design time description 940. Similarly, the behavior implementation 930 may send a raise indication to an event infrastructure XBE runtime 950. The event infrastructure XBE runtime 950 may then communicate with an event mesh 960 via AMQP.

Figure 10:
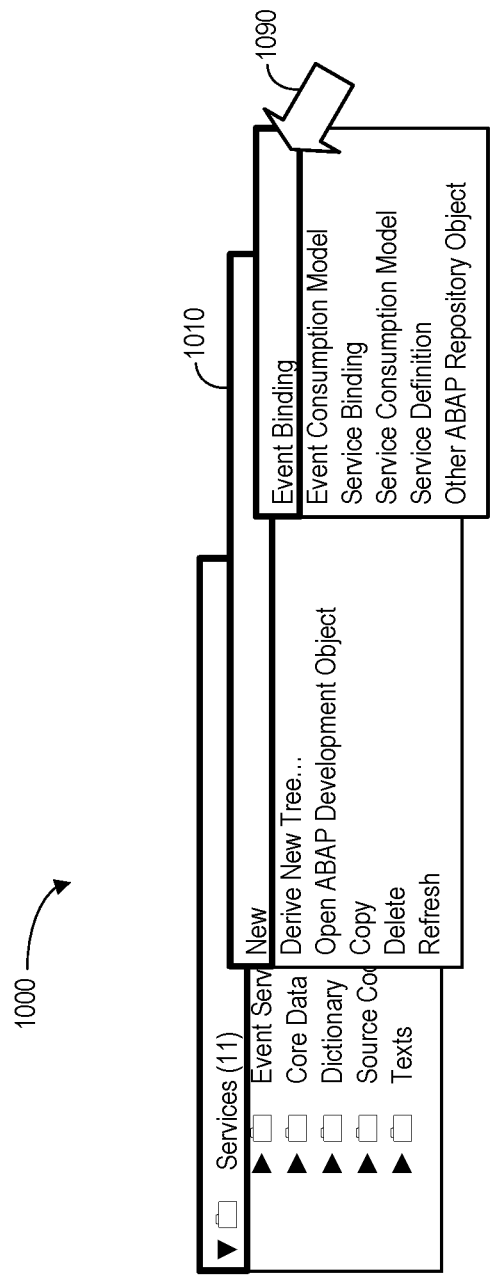
FIGS. 10 through 17 are enterprise event development displays according to some embodiments.
Figure 11:
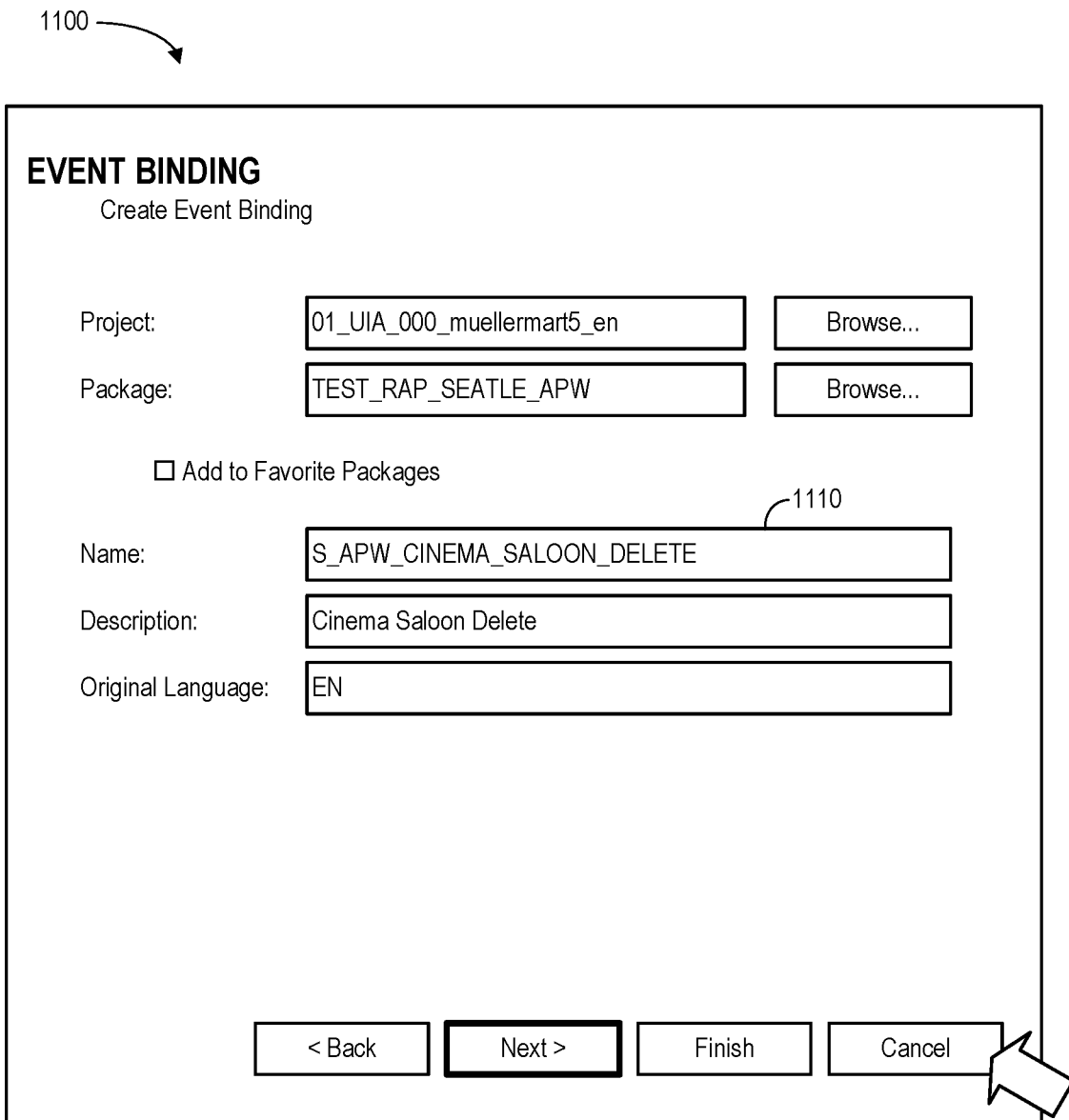
Figure 12:
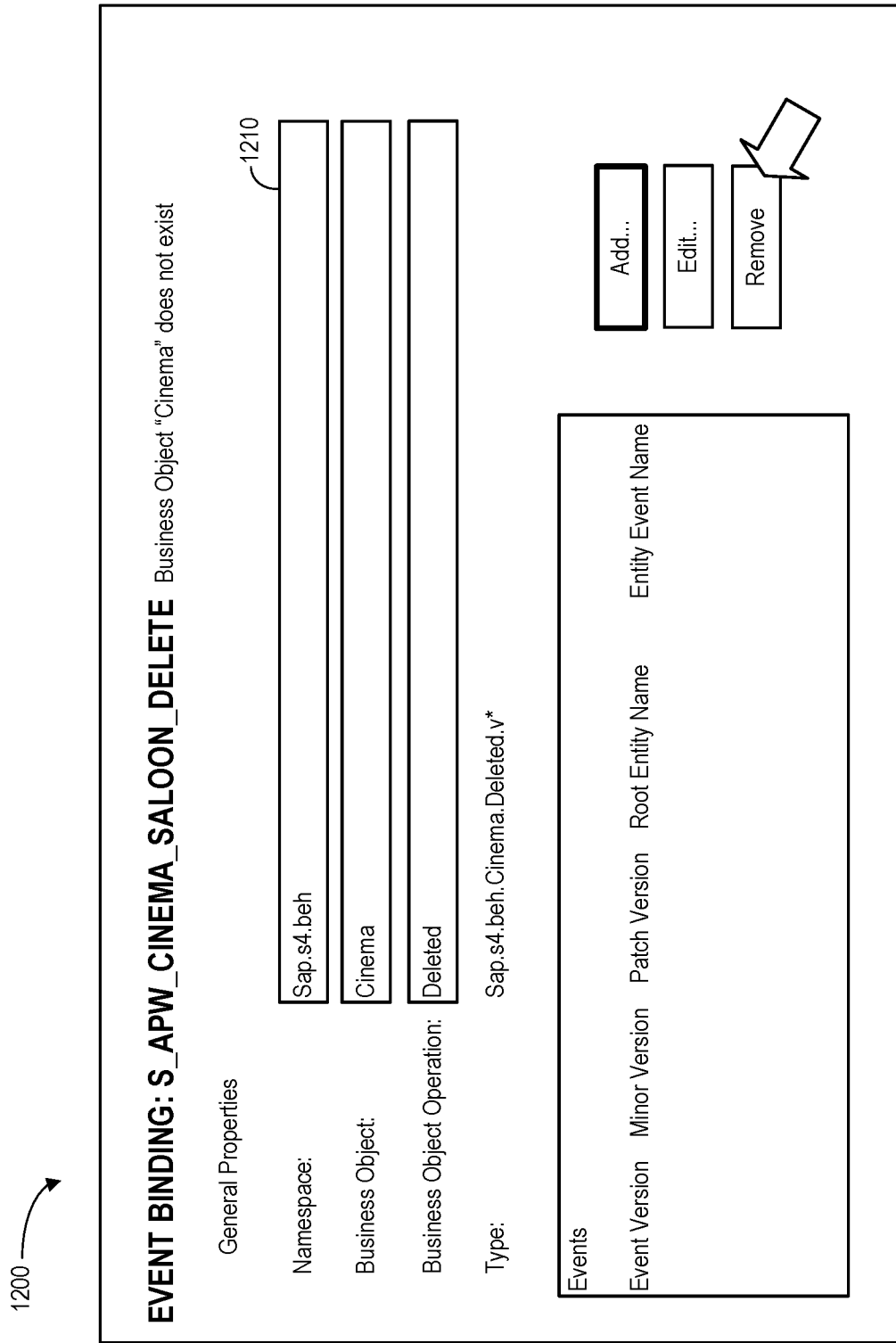
Figure 13:
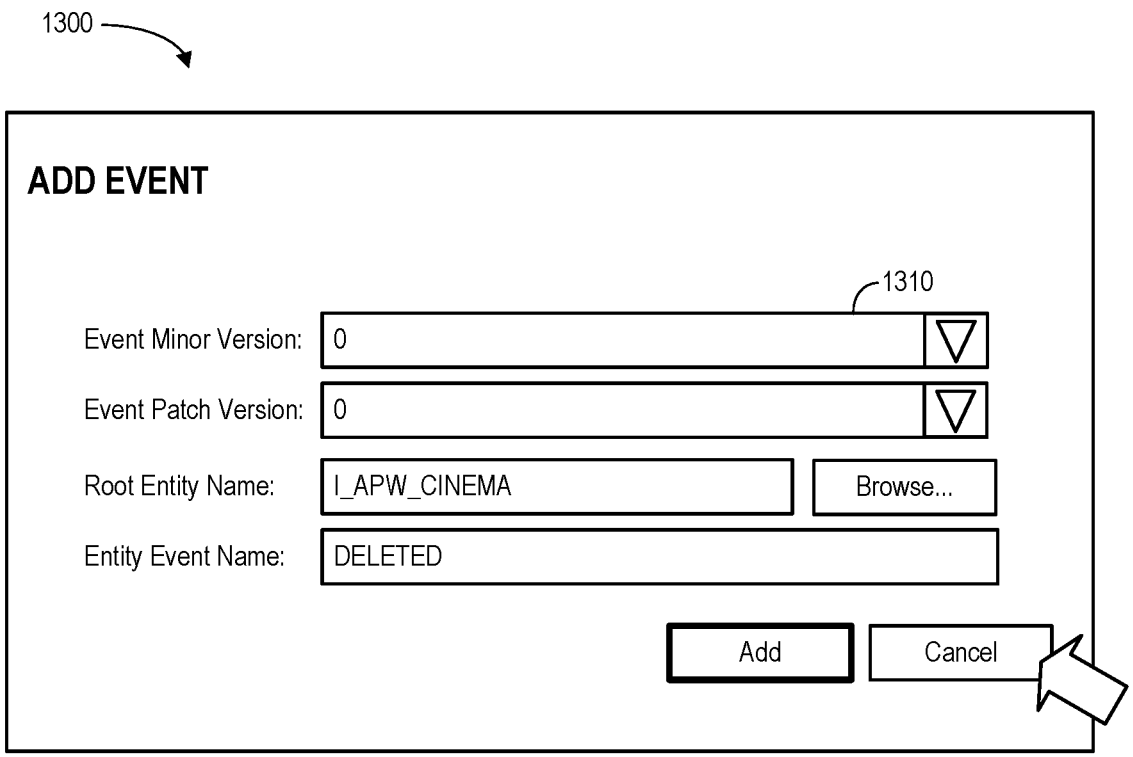

A RAP entity event may be defined in the behavior definition 920 via a UI. For example, FIGS. 10 through 17 are enterprise event development displays according to some embodiments. In particular, FIG. 10 shows a display 1000 to create a new event binding. The display 1000 includes a series of menus 1010 through which a user (e.g., via a touchscreen or computer mouse pointer 1090) can elect to perform a new event binding action for business services. FIG. 11 shows a display 1100 to define event binding parameters. The display 1100 includes data fields 1110 that may be used to provide, for example, an even project, package, name, description, and language. Moreover, selection of a "Next >" icon may, if that business object does not already exist, result in a warning display 1200 such as the one illustrated in FIG. 12. The display 1200 includes data fields 1210 that may be used to provide, for example, general properties such as a namespace, a business object, a business object operation, and type. Moreover, the 1200 may include a list of existing events including an event version, an event minor version, an event patch version, a root entry name, and an entity event name (shown as empty in FIG. 12).

Figure 14:
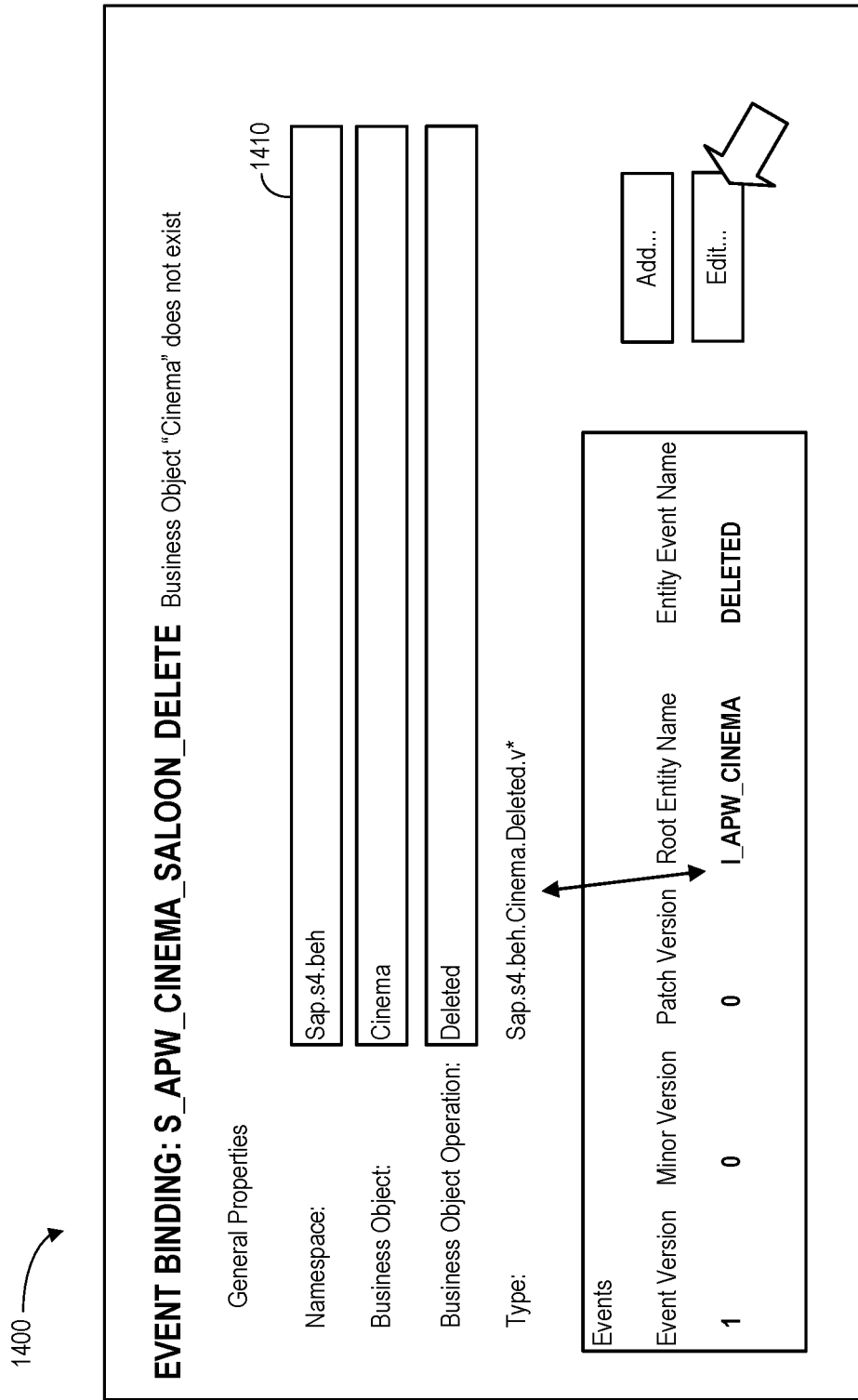

Selection of an "Add . . . " icon on the display 1200 may result in an add event display 1300 such as the one illustrated in FIG. 13. The display 1300 includes data fields 1310 that may be used to provide, for example, an event minor version, an event patch version, a root entity name, and an entity event name. Selection of an "Add" icon on the display 1300 may result in an updated event binding display 1400 as illustrated in FIG. 14. Here, the information previously entered by the user via the UI is used to populate the event list (e.g., an event version, an event minor version, an event patch version, a root entry name, and an entity event name) as illustrated by arrow in FIG. 14.

Figure 15:
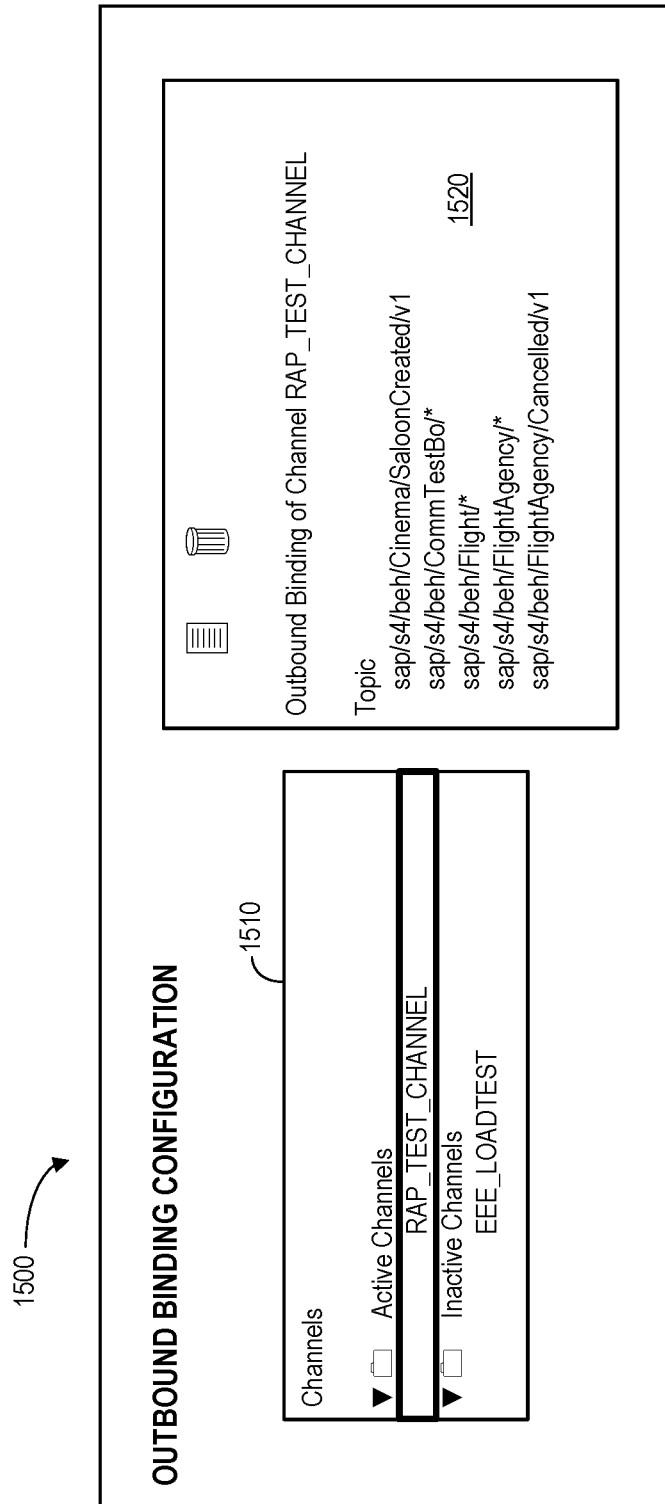
Figure 16:
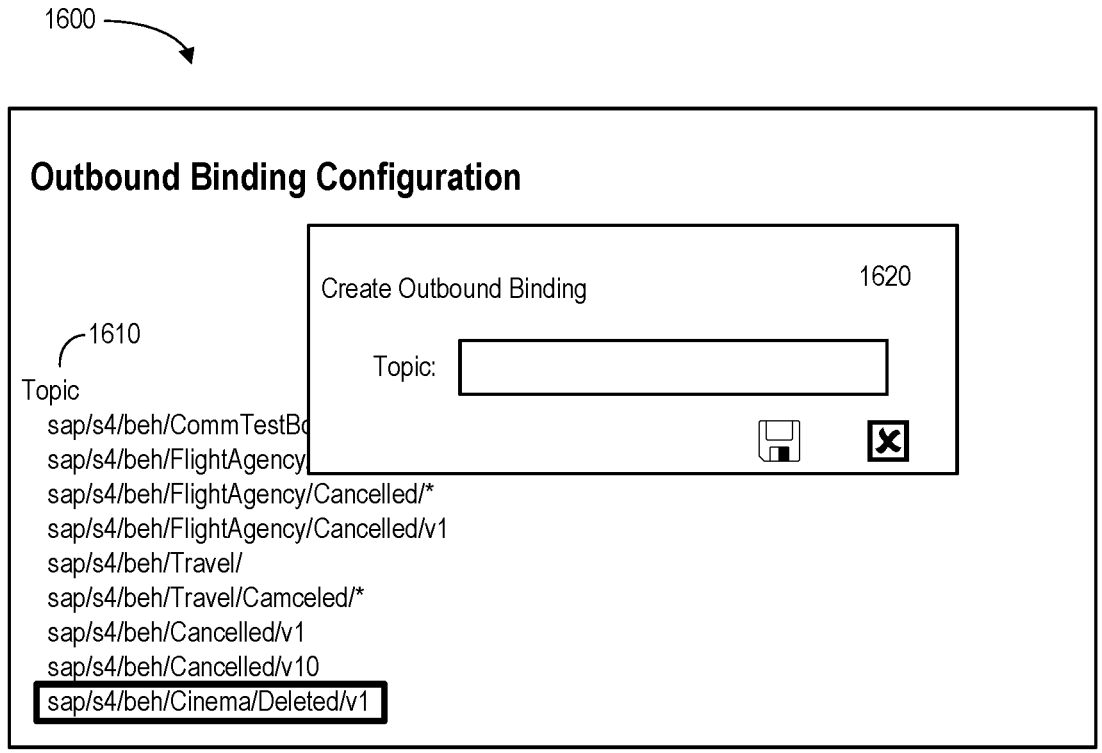
Figure 17:
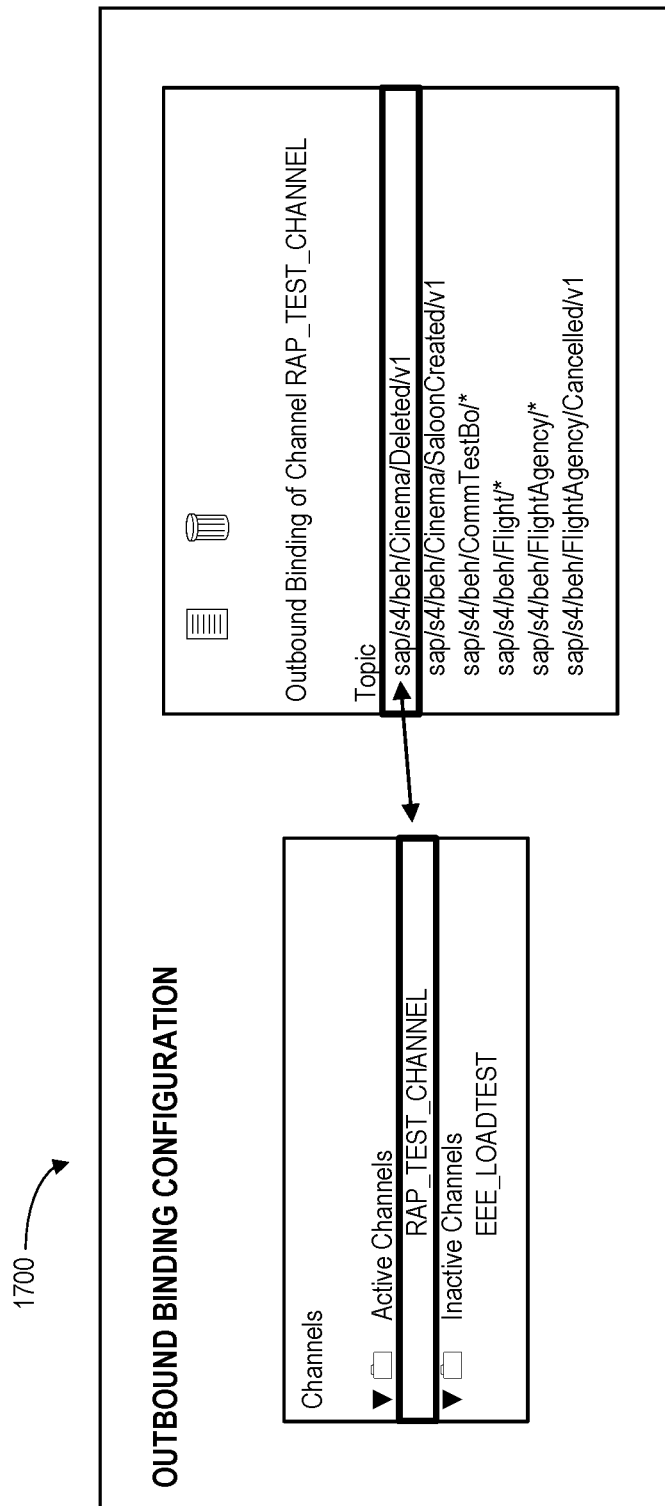

The user may assign the created event to a channel. For example, FIG. 15 shows a binding configuration display 1500 that may be used to select an active channel 1510 that was previously setup (e.g., "RAP_TEST_CHANNEL") to a new outbound binding 1520 (e.g., "sap/s4/beh/Cinema/SaloonCreated/v1"). A display 1600 such as the one shown in FIG. 16 may be used to select an event type or topic 1610 associated with an outbound binding 1620. When assigned, a binding configuration display 1700 may be updated as shown in FIG. 17.

Optimize Runtime Behavior by Synchronizing Runtime Configuration

The Enterprise Event Enablement ("EEE") framework in an ABAP-platform may be responsible for the exchange of events between the ABAP-platform and an event mesh (and, eventually, external applications). As a result, connectivity between the ABAP-Platform and the event mesh service in EEE may need to be initially setup. Subsequently, a configuration may be created to define which event types have to be published from the ABAP-platform and to which types of event the ABAP-based product wants to subscribe. To minimize the number of processed events, the system may pass an existing configuration to the domain framework of the business object raising the events. At any point in time, a developer can introduce additional (or delete existing) event types for an existing business object in the domain framework.

Therefore, it may be desirable to avoid any inconsistencies between the EEE configuration and the involved development artifacts defined by the business developer. For example, in the configuration one can define event types using wildcards such as "sap/s4/beh/SalesOrder/*". Such an entry might be internally resolved as, for example, "sap/s4/beh/SalesOrder/Created" and "sap/s4/beh/SalesOrder/Deleted" and passed back to the domain framework of the business object. As a result, only "./Created"and"./Deleted" event types are emitted to the event mesh.

If an additional event is appended to the business object during development, the configuration in EEE and in the corresponding business domain framework should be updated to reflect the new event type. Within the ABAP-platform, some embodiments use transport management to ship development and customizing changes of various artifacts to the ABAP landscape. The transport system enables development object-specific integration in which information is available about imported changes.

Once a domain framework integrates itself into the transport system, an API may let the domain framework call EEE when the corresponding development artifacts of the event producer change. This change will be noticed once a new transport is imported into the system on which the event producer and the corresponding development artifacts are located. When being notified about any changes, EEE may invalidate a metadata cache and recalculate the event types for the particular event producer. That is, each existing channel configuration and outbound binding (that contain the particular changed event producer) needs to be checked for validity.

Each valid outbound binding entry may then be transferred to the domain framework of the relevant business object via a callback. This may help ensure that the information about the existing configurations in EEE is also available on the domain framework side. Depending on the origin of the event producer, the outbound binding might be migrated to the newly introduced domain framework within the ABAP-platform RAP model. This migration process may include the deletion of the existing outbound binding after the migration is completed. Subsequently, the callback mechanism may be triggered for all domain frameworks to inform them about the updated metadata (letting them update the responsible repository).

By recognizing the changes to the development objects at an early stage, the respective caches required for the runtime, for sending events, can be optimized and renewed at design time. Thus, embodiments may improve EEE performance during runtime. In addition, no unnecessary event types are processed by the domain framework (which are not published by EEE), and events for newly created event types can be emitted at runtime.

Event Consumption

Generation of Event Consumers in ABAP Platform

The AsyncAPI Specification is a project used to describe and document message-driven APIs in a machine-readable format. To let ABAP-based products also build solutions based on event-based communication patterns, it may be important that AsyncAPI specifications can be understood and integrated in the ABAP platform. The AsyncAPI specification describes the structure of header and payload of event types emitted and consumed by applications.

To consume an external event type in an ABAP platform, a system may import the structure information from the corresponding AsyncAPI specification into a corresponding and/or appropriate structure representation in ABAP. The structure information may be parsed and translated into structures in ABAP to reflect the event type at runtime. Thus, embodiments may arrange to have an event type representation in ABAP reflect the event schema specification expressed in the AsyncAPI format. Note that an application based on the ABAP platform requires a consumer implementation in which it can handle incoming events. The corresponding event handler classes may get an event object which contains the header information and typed data container for the payload data of the event. Because event definitions might change over time, embodiments may adjust the event handler classes and regenerate the data container for the specific event types in ABAP without losing the implementation of the specific event handler.

To achieve the correct event type representation in ABAP, an event schema may be typed as a structure of a Core Data Services ("CDS") hierarchy. Each event type has a behavior definition, which defines the hierarchical connection of the same named root abstract entity and its associated abstract entities. The root abstract entity can have one to many elements. Each element is either a primitive property with an ABAP data type, an association to a scalar entity for primitive collections, an association to another abstract entity, or an association to a collection of another abstract entity. The root abstract entity is the type of the business data of an event type.

To achieve the correct typed data container, embodiments may arrange for each event type to have an interface declaring the type of the event as the generated root abstract entity. One main event handler interface has one method for each event type (with the typed event as its input parameter). A base consumer class has an abstract implements of the event handler interface. In its local types, a local class for each event type is generated, which implements the respective event interface. The base consumer class also implements a method to handle all incoming events. If a cloud event is received, it casts the event to the fitting type of the local classes based on the event type. Then, it may call its respective event handler method with the typed data container.

To achieve regeneration, embodiments may generate a second consumer class (inheriting from the base consumer class). It implements the typed handle event methods. The developer can add business logic there for the typed event arguments. When a new event type is added to the specification and a regeneration is necessary, a new event types may be patched into the existing structure, with a newly generated abstract entity hierarchy for the event type. Then, a new event interface is created, a new local class is patched into the base consumer class, and a new line in the distribution switch is added. Finally, a new empty handle event method is added to the existing consumer class extension.

Note that previously, there was one consumer class which implemented the consumer interface, which made a regeneration without losing business logic impossible. In addition, each event was generic and did not contain a typed data container for the payload of the event. Embodiments described herein facilitate the regeneration of the event consumption model without losing any business logic (because the business logic is separated from the typing and distribution logic). It is also possible to patch new event types into the existing structure, since the system only has to generate a new abstract entity hierarchy for the event type, create a new interface, patch a new local class, add a new line in the distribution switch to the base consumer class, and add a new method to the existing consumer class extension. Furthermore, each handle event method has a typed event as its input argument. Thus, the customer can get a typed business data from the event instead of getting a generic data object (as was previously required).

Figure 18A:
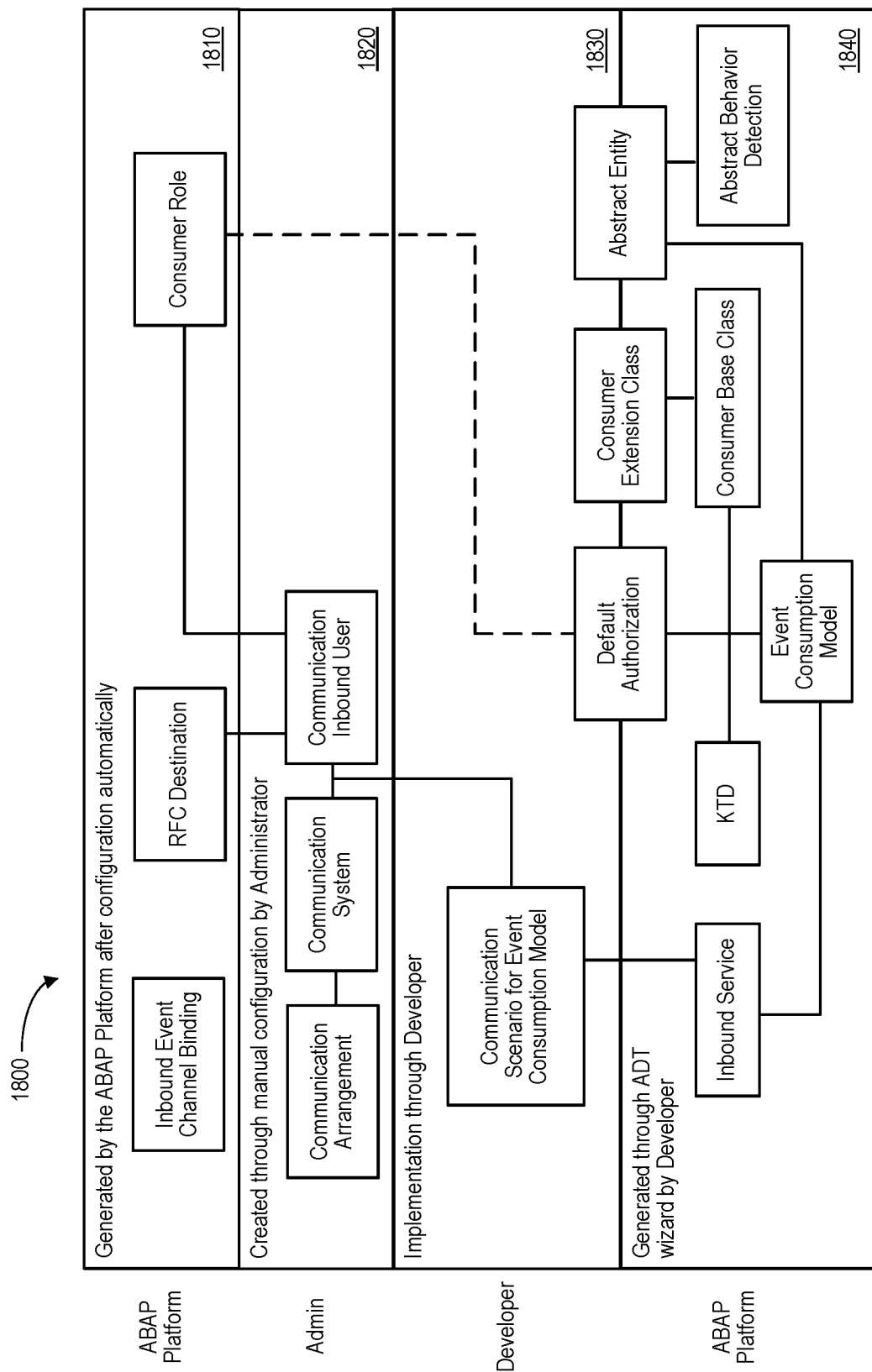
FIG. 18A shows generation of an event consumers in ABAP platform-based products in accordance with some embodiments.

FIG. 18A shows 1800 generation of an event consumers in ABAP platform-based products in accordance with some embodiments. An ABAP platform may generate 1810, after automatic configuration, an inbound event channel binding, a Remote Function Call ("RFC") destination, and a consumer role. An administrator may create 1820, after manual configuration, a communication arrangement, a communication system, and a communication inbound user. A developer may implement 1830 a communication scenario for an event consumption model, a default authorization proposal for event consumption model (to accomplish authentication default values), a consumer extension class (associated with the consumer role and implementation of the event handler methods), and an abstract entity (which can be enhanced with semantic annotations). The ABAP platform may then generate 1840, such as via an ADT wizard, an inbound service, a Knowledge Transfer Document ("KTD"), an event consumption model, a consumer base class, and abstract behavior detection.

Figure 18B:
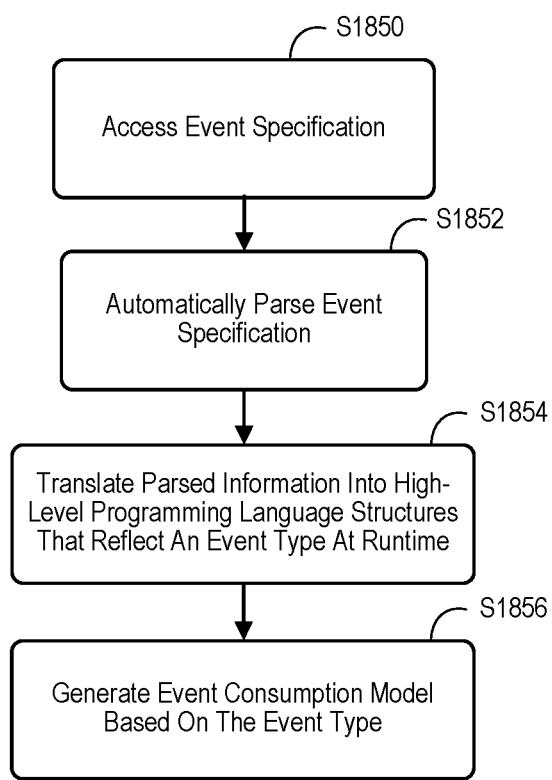
FIG. 18B is an event consumer generation method according to some embodiments.

FIG. 18B is an event consumer generation method according to some embodiments. At S1850, a high-level programming language development tenant of a business technology platform may access an event specification. In some embodiments, this access may be via a standalone API enterprise hub. However, the specification might instead be uploaded into a tool after it has been downloaded from any other arbitrary location. At S1852, the system may automatically parse the event specification and translate the parsed information into high-level programming language structures that reflect a runtime event type at S1854. At S1856, the system may generate an event consumption model based on the event type.

Note that a developer in ABAP Development Tools ("ADT") may want to generate a consumer from an existing AsyncAPI specification. The specification may be parsed into ABAP structures before the relevant event types for the consumer can be selected by the developer for the desired consumer. Therefore, the AsyncAPI may be converted to fit a consumer. With the converted AsyncAPI, a consumer class with its extension and interfaces can be created. The extension is necessary to separate an alteration from customers from the generated code and enable a regeneration without information loss. A consumer object may also be created from this extension class. Embodiments may be implemented, for example, via a consumer wizard in ADT.

Figure 19:
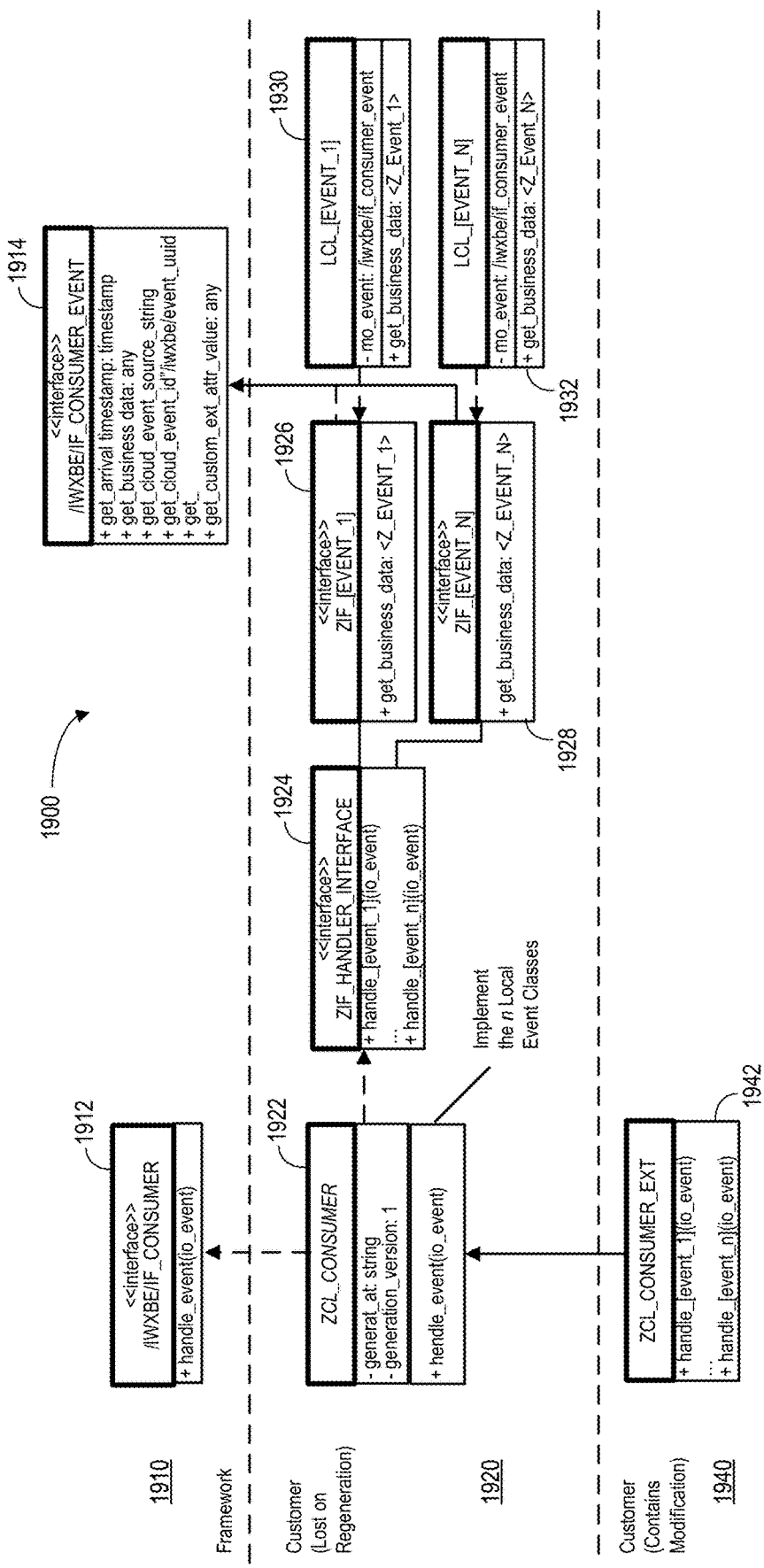
FIG. 19 is a consumer generator architecture in accordance with some embodiments.

FIG. 19 is a consumer generator architecture 1900 in accordance with some embodiments. The architecture 1900 may include a framework 1910 including a /IWXBE/ IF_CONSUMER 1912, a customer (lost on generation) 1920, and a customer (containing modification) 1940. The implementation may be separated into two classes, n local classes and n+1 interfaces, for each generated consumer. The first interface is the handler interface ZIF_HANDLER_INTERFACE 1924, which contains n methods handle_[event_i] to handle events for each of the n event types. The input io_event is a typed event. This event is of the type of one of the n generated event interfaces ZIF_[EVENT_I]1926. These interfaces inherit from the /IWXBE/IF_CONSUMER_EVENT 1914 and add a method get_business_data returning a typed event of a generated abstract entity Z_[EVENT_I]. The consumer class ZCL_CONSUMER 1922 implements the interface method /IWXBE/IF_CONSUMER~handle_event and forwards the events based on their event type to one of the n handle event methods from the interface ZIF_HANDLER_INTERFACE 1924. This interface is implemented as abstract. The implementation for the event interfaces are done as local classes LCL_[EVENT_I] 1930 as part the consumer class. The consumer class extension ZCL_CONSUMER_EXT 1942 inherits from the consumer class ZCL_CONSUMER 1922 and implements the methods from the handler interface ZIF_HANDLER_INTERFACE 1924. The consumer object is built from the consumer class extension. Since the consumer class extension with possible customer coding is separated from the generated functionality, a regeneration is possible without any information loss.

Embodiments may use an Extension Components ("XCO") standard library for the generation of the consumer. The consumer generation is implemented in a newly created class/iwxbe/cl_consumer_generator implementing its public facing methods from the interface/iwxbe/if_consumer generator. The generator instance is created for a given package and an optional transport. If the transport is not supplied, the XCO generation environment is set to local.

The interface/iwxbe/if_consumer generator contains two methods. One of the methods is generate_consumer(is_consumer_template). It expects a generation template structure as its input containing meta information about the to be generated classes, such as the names for the general classes and interfaces as well as the consumer key. In addition, it contains all necessary information for every event type to generate its event interface and implementation and handle_event method.

The generate_consumer method starts by updating the generation timestamp my_time in the method update_timestamp( ). To make the timestamp testable, the timestamp is only updated if it is not set yet. Afterwards, it creates a XCO put and patch operation. In XCO, operations are a collection of virtual object alteration instructions. The actual generation takes part only during execution.

Next, the given consumer template is stored as an attribute, to avoid passing it to every following method. Additionally, it is validated in the method validate_template( ) to ensure, that its meta information is not initial. Note that the validation only validates that is not initial. Every other invalidity will be either prevented in another method or will lead to an exception.

Next, for every event type its typed handle_event method is added to the handler interface and a typed event interface is added for generation. The typed event interface implementation is added as a local class to the consumer class. In addition, a barebone implementation of the typed handle_event method is added to the consumer class extension. Finally, the operations are executed realizing the virtual objects. After this, the EEE consumer object and its inbound services are created in the method create_consumer_object and create_inbound_service respectively.

The handler interface ZIF_HANDLER_INTERFACE 1924 contains a typed handle_event method for every event type. Each method as an event as its input which type is the generated event type's event interface. The handler interface is based on an XCO-put-operation for interfaces. It has a short description of Generated handler for {ms_consumer_template-consumer_class_name} to make the connection to the consumer class easily visible. Additionally, through the description it is clear, that this object was generated. Note that a short description may be added to any XCO specification. Otherwise, the operation's execute method will throw an unexpected generic runtime exception.

Each event type ZIF_[EVENT_1] 1926 and ZIF_[EVENT N] 1928 has its own event interface. It inherits the interface /iwxbe/if_consumer_event. This inheritance is needed to overload the consumer event's un-typed get_business_data method. Since ABAP does not support overloading, each method from the /iwxbe/if_consumer_event gets an alias defined except for the get_business_data. In its place, a new typed get_business_data method is added. This gives the user a natural experience when accessing the typed event object. The event interface is based on an XCO-put-operation for interfaces. It has a short description of Generated event interface for {iv_consumer_class_name}|. It uses the table with all/iwxbe/if_consumer_event methods from the method get_event_class_methods to add the alias for each.

The consumer class ZCL_CONSUMER 1922, LCL_[EVENT_1] 1930, and LCL_[EVENT_N] 1932 implements the interface/iwxbe/if_consumer as well as the handler interface; the latter as abstract methods. Additionally, it has two constants for the generator version and generation time. These constants are also part of its short description.

The implementation of the typed event interface is added as a local class to the consumer class for each event type. lo_local_class_specs=io_specification→add_local_class (is_event_type-local_class_name). In its constructor, an un-typed event object is stored as an attribute. Each method from interface/iwxbe/if_consumer_event is then implemented by calling the corresponding method of the stored event. The code for the implementation is from the method get_event_class_method.

The consumer class extension ZCL_CONSUMER_EXT 1942 is an empty shell for the customers own implementation. It is the basis for the EEE consumer object. To link it to the consumer class, it has the description |Generated extension for {ms_consumer_template-consumer_class_name}|.

For each event type a handle_event method is then added to the extension class. If the consumer class already exists, the argument io_patch_obj is bound, since it is patch operation. In this case, the method does_cons_ext_method_exists( ) is used to check if the handle_event implementation exists as well. Only if it does not exist yet, the method is added.

For the usage of the consumer in a cloud environment, it may be necessary for the EEE to create an inbound service. This inbound service references a specific generated consumer. In addition, the inbound service lets the customer assign authorizations (which are tailored to the needs of the customer communication scenario).

For the creation of the inbound service, the API of communication management may be used (e.g., as a ticket component). Note that this API is only available within cloud systems. As a result, an adapter class may be implemented in the cloud development system.

The other public facing method can be used to remove a previously generated consumer. First, it creates a class delete operation in the method get_xco_class_delete_operation( ). Then, it adds the consumer class and consumer extension class to it. After this, an interface delete operation is created in the method get_xco_intf_delete_operation( ). Next, the handler interface and every event interface for each event type are added for deletion. Finally, both deletion operations are executed. If the deletion worked without exception, the consumer object is deleted in the method delete_consumer_object( ).

After an existing AsyncAPI specification has been parsed into ABAP structures, the relevant event types and corresponding payload for the consumer may be generated. Similar to the event production in RAP, embodiments may use abstract entities for the representation of the consumer event types. Therefore, an abstract entity generator is used in some embodiments (but note that this regeneration may instead be part of a consumer wizard in the ADT). Eventually, the abstract entities of a given consumer are read by the generic consumer descriptor to create the corresponding consumer description.

The creation of a specific abstract entity may consist of three steps: (1) add XCO abstract entity object to PUT operation; (2) add general annotations to XCO entity object; and (3) add XCO entity fields and/or elements and corresponding annotation to abstract entity object. During step (2), the event specific annotations, which contain the event type and description may be added. In the step (3), the system may loop through all elements of the abstract entity and create the primitive or complex types using the build in XCO types or associations to underlying abstract entities, respectively.

Figure 20:
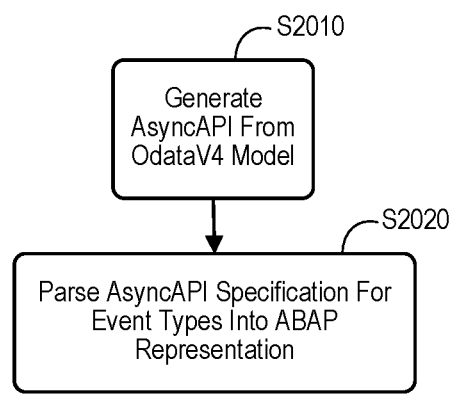
FIG. 20 is an overview of AsyncAPI processing according to some embodiments.

The creation of the specific abstract behavior definition consists of four steps: (1) add XCO abstract behavior definition object to PUT operation; (2) add XCO behavior definitions and corresponding associations to abstract behavior definition object; (3) add scalar entity definition and field name to abstract behavior definition object; and (4) add suppressed dummy field for entities, that only contain associations Embodiments of the present invention may be associated with automated conversions of AsyncAPI specifications. For example, FIG. 20 is an overview of AsyncAPI processing according to some embodiments. At S2010, an AsyncAPI specification may be automatically generated from an OdataV4 model. At S2020, an AsyncAPI specification may be automatically parsed for event types into an ABAP representation. These two processes will no be described in more detail in connection with FIGS. 21A through 29.

Generate AsyncAPI Specification from OData Model

The structure of event types defined in ABAP (e.g., in a RAP model for an ABAP platform) may be represented technically through a model that is based on the ODataV4 protocol. Metadata of events is represented in the AsyncAPI format which is the commonly agreed metadata format for event-driven communication. To let external applications consume events defined and emitted in an ABAP-based application (e.g., S/4HANA cloud), it may be necessary to extract the structure definition from an ABAP-based application and transfer it into the AsyncAPI format. As a result, the ODataV4 representation of the event type may be converted into a corresponding AsyncAPI representation.

First, from the model based on ODataV4, an ABAP structure representing the AsyncAPI is filled. The AsyncAPI property channels are filled with the relevant event types and a reference to the description of the payload within the AsyncAPI document. Each channel can also be annotated with a text description of the event type. The component property contains event type relevant information, event context attributes, and a reference to the structure of the payload of the event.

The payload is described in the component-schema property. After filling the ABAP structure from the ODataV4 model, a simple transformation is used to render the AsyncAPI file. Note that, as used herein, the phrase "simple transformation" does not imply an "easy" transformation (e.g., instead, a "simple transformation" may refer to a programming language for transforming ABAP structures into XML and vice versa). In addition to rendering a single event producer into an AsyncAPI file, embodiments may also support the creation of a single AsyncAPI file containing the metadata for all known event producers of a given system. This may be done, for example, to support the publishing of AsyncAPI specifications for event types on a standalone API enterprise hub. Typically, it has not been possible to generate an AsyncAPI specification for event types defined in an ABAP platform and represented through an ODataV4 model.

Figure 21A:
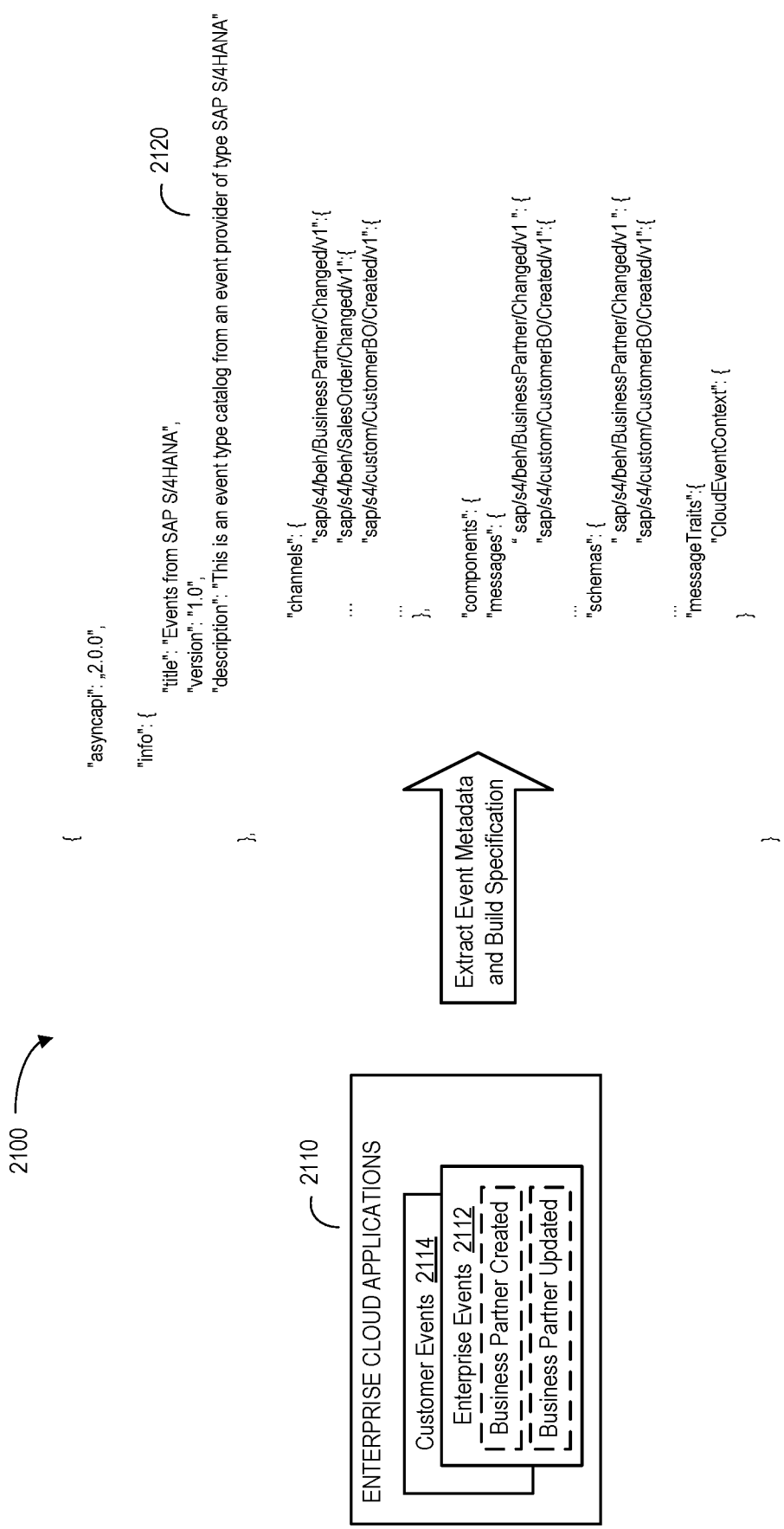
FIG. 21A shows generation of an AsyncAPI specification from an OdataV4 model in accordance with some embodiments.

FIG. 21A shows 2100 generation of an AsyncAPI specification 2120 from an OdataV4 model in accordance with some embodiments. In particular, the model may be associated with enterprise cloud application 2110, including enterprise events 2112 and customer events 2114, and the conversion may include extracting event metadata and building the specification 2120.

Figure 21B:
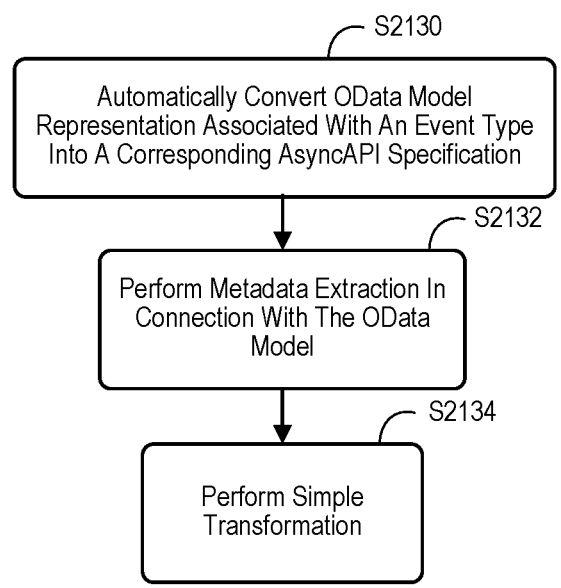
FIG. 21B is an AysncAPI generation method according to some embodiments.

FIG. 21B is an AysncAPI generation method according to some embodiments. At S2130, an OData model representation associated with an event type is automatically converted into a corresponding AsyncAPI specification. At S2132, metadata extraction is performed in connection with the OData model and a simple transformation is performed at S2134.

An enterprise application, such as SAP® S/4HANA™, may emit events and connect to enterprise messaging to exchange those events. Customers can use enterprise messaging to connect enterprise and third-party products via events. Enterprise Event Enablement ("EEE") may apply the cloud events standard for the runtime representation of an event. As used herein, the term "cloud events" may refer to a specification for describing event data in common formats to provide interoperability across services, platforms, and systems. An event is a form of an API and thus may need to be documented for the customer on an API enterprise hub (e.g., a central catalogue of APIs for application developers to search, discover, test, and consume using a Business Technology Platform ("BTP")). According to some embodiments, the EEE applies the AsyncAPI standard to document the content provided by the enterprise and custom producers/consumers. The AsyncAPI document can be retrieved via an exposed OData service.

To provide a proper content in the AsyncAPI or OData service, two changes may be made for a read description interface: (1) get_leaf_topics to retrieve only the leaf topics of the current description topic trees; and (2) get_topic_filters to support an importing parameter iv_include_subtree_wildcards. This parameter controls if the topic filters are returned with or without subtree wildcards ('*').

Instead of concatenating the topic string and the description namespace in different locations (depending on the context), a new parameter may be used iv_with_schema_namespace at the get_topic_string method. Since a topic is aware of its description, a string concatenation depending on this parameter is performed. In order to be able to determine the topics, the corresponding descriptor classes may be instantiated. Since these classes can contain syntax errors, it is necessary to instantiate these classes securely so that, for example, the topics of the error-free descriptors can be determined. Therefore, the descriptor classes are initially instantiated for testing purposes in an asynchronous RFC call /IWXBE/FM_DESCRIPTOR_SYNT_CHCK. Only when the result is positive are these classes instantiated again and placed in a cache.

As the payload type and the payload property contain the complete information (such as the OData related object) a separate interface for the framework may be introduced. This interface facilitates the object (type/property) to provide the necessary information when creating the JavaScript Object Notation ("JSON") schema.

To support and fill different sections in the AsyncAPI, additional information on a topic and the description may be provided. For example, a documentation API may let the descriptor provide this additional information while creating the topic tree in the method describe_topics. The information provided for the description and the topics are then also cached via the description data.

Figure 22:
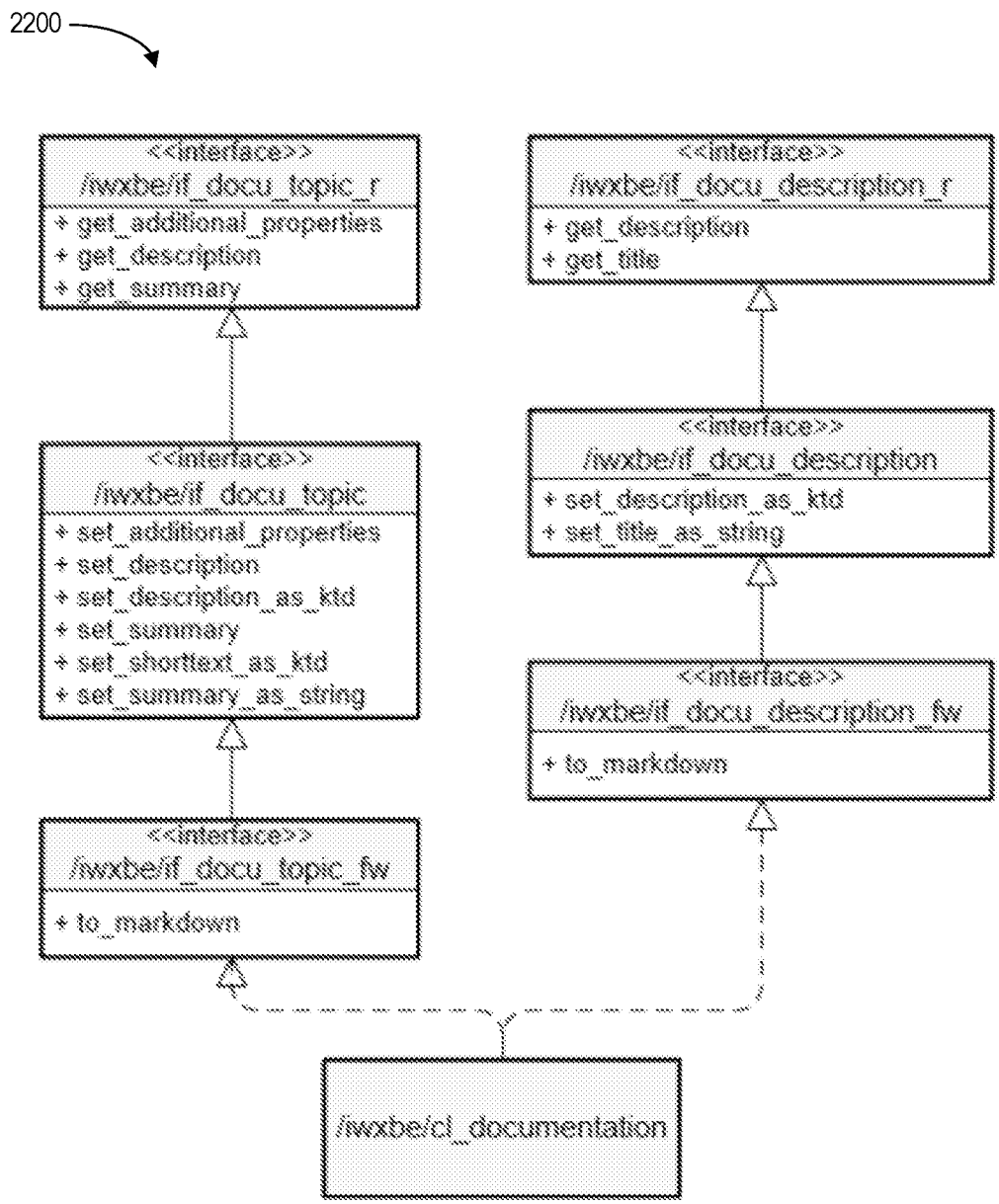
FIG. 22 illustrates a documentation API in accordance with some embodiments.

FIG. 22 illustrates a documentation API 2200 in accordance with some embodiments. In particular, the API 2200 illustrates the hierarchy for the topic and the description related documentation interfaces. The hierarchy may be created while using the inheritance of the interfaces. The read only interfaces are responsible for the get-part, and the interfaces without a prefix are responsible for the set-part (the get-part is only inherited). Both interfaces are publicly available and are part of the corresponding package interface. Lastly, the framework relevant interfaces are not visible for public usage and are most likely used for structural changes which may be done by the EEE.

FIG. 23 is a listing 2300 that shows how a descriptor can use a documentation API according to some embodiments. The interface /iwxbe/if_docu_topic facilitates the setting of summary, description, additional properties, and short text. Short text and description can be set from an existing KTD linked to an object referenced by its object type and object name. Both the type and name may be needed to reference an object, otherwise an exception will be thrown. An exception is also thrown if no KTD exists for the referenced object. Summary and description might additionally use objects by handing over the document ID and a document object. Within ABAP this was the way of dealing with translatable text, and hence is still supported by the EEE. The KTD is the preferred medium for the documentation. Meaning that once this information is provided, it is going to be used for the AsyncAPI. Note that a summary may also be set directly with a string instead of a reference.

The AsyncAPI which needs to be rendered might, according to some embodiments, be aligned to version 1.1.0. Hence the OData service is working on the interface /iwxbe/if_catalog_writer to retrieve the AsyncAPI out in a xstring. In general, there are the different ways to instantiate an AsyncAPI writer: (1) channel specific; (2) description specific; and (3) unspecific (all known producers). Note that all three creation methods follow the same logical principal to fill the internal structure. This internal structure is used for the simple transformation and is therefore following the building blocks from AsyncAPI 1.1.0.

Figure 24A:
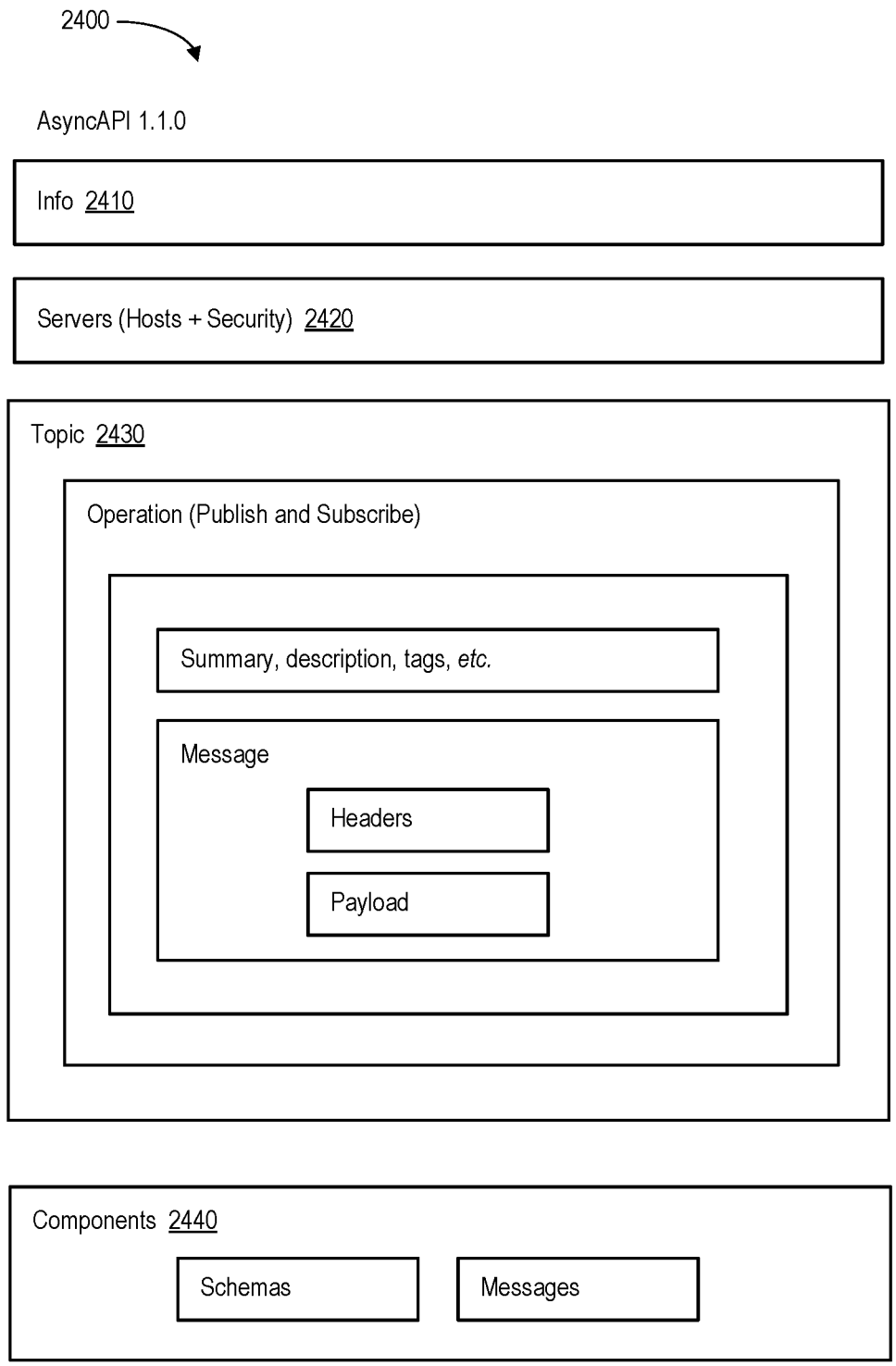

FIG. 24A is a structural AsyncAPI v1.1.0 overview 2400 in accordance with some embodiments. The structure includes general information 2410 and servers (e.g., hosts and security) 2420. The structure also includes topics 2430 having publish and subscribe operations, summaries, descriptions, tags, and messages (including a headers and payloads). Finally, the structure includes components 2440 including schemas and messages. The procedure of filling this structure is sequential from top to bottom. For each known event topic an entry in topic, schema and messages is made.

To provide a faster de/serialization of the AsyncAPI JSON, a version specific simple transformation is created: /IWXBE/ST_ASYNC_API_V11. While creating an AsyncAPI writer object, no serialization of the structure is done. Only while requesting the actual Xstring (/iwxbe/if_catalog_writer\~get_output) will the information be transformed via the given simple transformation.

According to some embodiments, the AsyncAPI 2.0.0 may be supported by EEE. As the version 2.0.0 is slightly different from the previous version, a new implementing class may be used. The complete concept as well as the simple transformation may be kept from version 1.1.0. The factory methods of the class are still returning the interface/iwxbe/if_catalog_writer and are still the following three ways to instantiate an AsyncAPI writer (channel specific, description specific, and unspecific). The internal structure is used for the simple transformation and hence a new structure for version 2.0.0. may be created (/IWXBE/S_ASYNC_V20_CATALOG). All underlying elements may have the prefix async_v20. The creation of the structure is again following the building blocks from AsyncAPI 2.0.0 as shown by the overview 2402 in FIG. 24B. The structure includes general information 2412 and servers (e.g., hosts and security) 2422. The structure also includes channels 2432 having channel items, publish and subscribe operations, summaries, descriptions, tags, and messages (including a headers and payloads). Finally, the structure includes components 2442 including schemas, messages, and traits. The procedure of filling this structure is sequential from top to bottom. For each known event topic, an entry in channel, schema, and messages is made. In addition, the message trait is used to describe the overall cloud event context which is needed for the header part of the cloud event attributes.

To provide a faster de/serialization of the AsyncAPI JSON, a version specific simple transformation may be created: /IWXBE/ST_ASYNC_API_V20. While creating an AsyncAPI writer object, no serialization of the structure is done. Only while requesting the actual xString (/iwxbe/if_catalog_writer\~get_output) will the information be transformed via the given simple transformation.

To get a version specific writer, a catalog writer factory may be provided. This factory may also have the same three instantiation methods but with a separate importing parameter which is used to differentiate between the different requested catalog formats: (1) channel specific; (2) description specific; and (3) unspecific (all known producers). Embodiments may support, for example, AsyncAPI 1.1.0 and 2.0.0.

The OData service may be the API endpoint used by enterprise messaging and the business API hub to gain information of the actual system and the event content known by the EEE.

A model provider extension may include the following entity types and/or sets: TopicPath (a traversal through the topic segments); Topic (actual representation of the outbound bindings; channel (all configured channels of the system and also supports a media stream; and EventCandidates (all available topics and also supports a media stream). The following function import may also available: GetChannelConfiguration (retrieve the service instance identifier from the enterprise messaging instance via a HTTP request POST and handshake). Note that supporting a media stream on the entity set may enable the retrieval of the AsyncAPI via application and/or JSON for corresponding.

A data provider extension may completely rely on either the AsyncAPI writer or the channel API. That implies that for the media streams the creation methods of the AsyncAPI writer are used and for the channel specific configuration the given channel API is used.

The AsyncAPI document contains all of the information needed to enable a generation of necessary development artifacts for the event consumption. To derive all the information from the AsyncAPI, an adequate way to read the information from the JSON may be provided (instead of parsing each and every string via regular expressions). According to some embodiments, the AsyncAPI 2.0 specification is objectified. The objectifying enables a smoother data retrieval for the developer. This reader API will be reused in the later process to accomplish a conversion between the AsyncAPI 2.0 and the development artifacts (e.g., descriptor and consumer).

Figure 25:
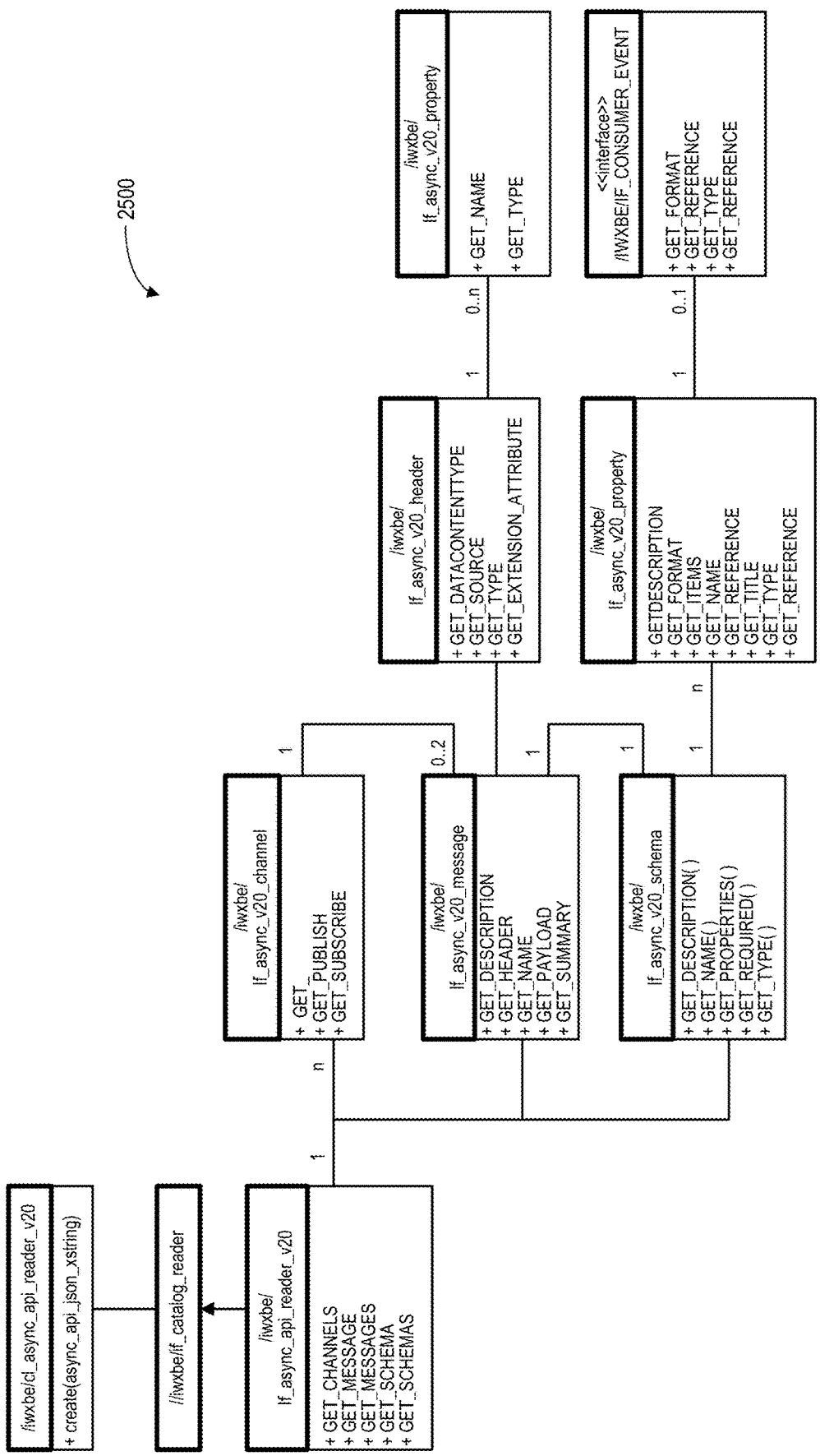
FIG. 25 is a class diagram overview of an AsyncAPI reader according to some embodiments.

FIG. 25 is a class diagram overview 2500 of an AsyncAPI reader according to some embodiments. For the instantiation of an AsyncAPI v2.0.0 reader, the factory method /iwxbe/cl_asnyc_api_reader_v20=>create( ) may be used. The returned instance will be already of type /iwxbe/if_catalog_reader and not AsyncAPI specific. This abstraction is needed in case another event documentation specification is introduced. Inside of the create method, the same transformation /iwxbe/st_async_api_v20 is reused (which was already created for the writer). Moreover, a validation of the JSON document and/or AsyncAPI v2.0.0 may be applied.

While using the /iwxbe/st_async_api_v20 transformation, the JSON object is moved into the corresponding internal structure.

The overview 2500 illustrates the possible navigation through the AsyncAPI and JSON objects. Once an instance is available, it can be cast to a specific /iwxbe/if_asnyc_api_reader_v20 interface. From there, the forward navigation through the JSON object tree exists. This navigation is completely based on the internal structure, which was filled in advance by the simple transformation. FIG. 26 is a transformation result 2600 in accordance with some embodiments. The complete implementation of the interfaces are in local classes within the /iwxbe/cl_asnyc_api_reader_v20 class (because the content of the interface implementation is very small and, apart from getter methods, no further content exists).

Parse AsyncAPI Specification for Event Types into ABAP Representation

The AsyncAPI Specification is a project used to describe and document message-driven APIs in a machine-readable format. To let ABAP-based products also build solutions based on event-based communication patterns, it may be important that the AsyncAPI specifications can be understood and integrated in the ABAP platform. The AsyncAPI specification describes the structure of header and payload of event types emitted and consumed by applications.

To be able to consume an external event type in the ABAP platform, embodiments may import the structure information from the corresponding AsyncAPI specification into the corresponding and appropriate structure representation in ABAP. The structure information may be parsed and translated into structures in ABAP which reflect the event type at runtime. To achieve this, embodiments may convert the presented AsyncAPI JSON into an ABAP readable representation by using a simple transformation. From this representation, all message types may be extracted (and each message represents an event type with its payload definition and additional properties such as a description). The system may then extract the properties of the message to convert them into elements of an abstract entity. According to some embodiments, there are four kind of elements:

1. Primitives, which are primitive ABAP data types.
2. Primitive collections, which are arrays of ABAP primitive data types. For these, a scalar entity of the ABAP data type is added to the structure and the element is stored as an association to that.
3. Complexes, which are objects themselves. Therefore, they are added to a list of new and dependent abstract entity. Their elements are recursively extracted as well. The first time an abstract entity is used in this hierarchy, its association is a composition. Hence, it is stored as a composition, when anew abstract entity is added to the list. Otherwise, the existing abstract entity is added as a simple association. Afterwards, the abstract entity is also added to a list for the behavior definition.
4. Complex collections, which are handled analog to complexes, but are arrays of objects.

Lastly, a new behavior definition is added containing the names of all connected abstract entities and hierarchical information. Note that previously it was not possible to convert an AsyncAPI specification into an ABAP representation in an automated way. Instead, to reflect the event type definition in ABAP the system needed to define the data structures, their relationships, conversions, and the corresponding event handling infrastructure manually. This approach was error-prone and not adjustable in case of event definition changes.

Figure 27A:
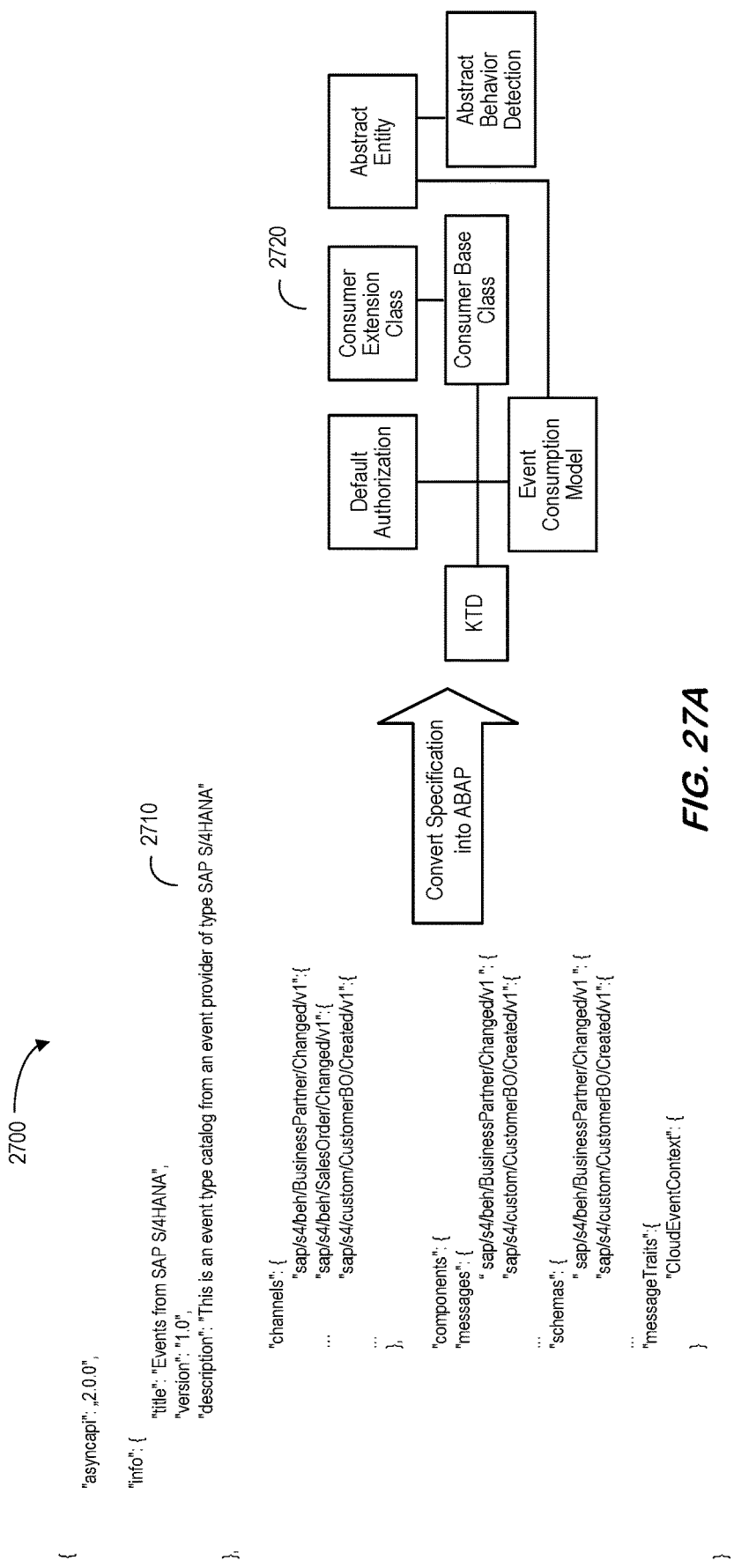
FIG. 27A shows a parsing of an AsyncAPI specification for event types into an ABAP representation according to some embodiments.
Figure 27B:
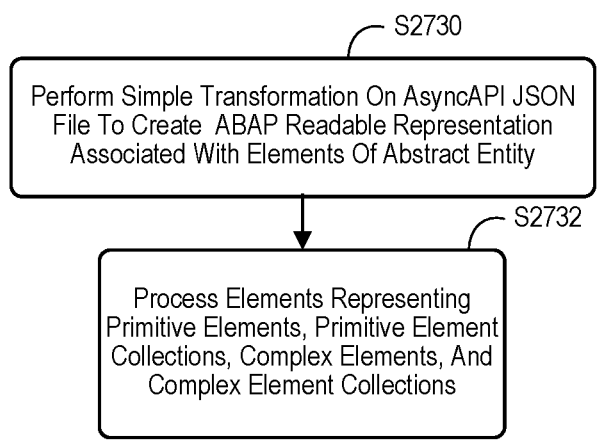
FIG. 27B is an AsyncAPI specification parsing method in accordance with some embodiments.

FIG. 27A shows 2700 a parsing of an AsyncAPI specification 2710 for event types into high-level programming language representation 2720 according to some embodiments. In particular, the JSON specification 2710 is converted into ABAP representation 2720. FIG. 27B is an AsyncAPI specification parsing method in accordance with some embodiments. At S2730, a simple transformation is performed on an AsyncAPI JSON file to create an ABAP readable representation associated with elements of an abstract entity. At S2732, the system may process elements representing primitive elements, primitive element collections, complex elements, and complex element collections.

Embodiments may utilize a XCO standard library for the generation of abstract entities. According to some embodiments, a private constructor has only one mandatory input parameter: io_catalog_reader, an objectified AsyncAPI JSON. The other parameters may be optional and stored as meta information (such as the namespace or consumer class's name).

According to some embodiments, AsyncAPI messages are extracted in a method extract_message( ). For each message, the type is assumed from its name in the method assume_type. Since the application namespace is unknown, a regex pattern may be used to filter the last segments from a given event type to assume the topic. The maximum amount of segments is two, whereas a possible version suffix is not counted. If an event type has less than four segments, the first segment is ignored. This process may be necessary, because the topic is used for a later name generation.

Next, an abstract entity name is determined from the topic with the method determine_abstract_entity name( ). The abstract entity name is a combination of a prefix from the namespace, set in the constructor and defaults to Z. It is then combined by underscores with the previously assumed type in upper letters. Since every abstract entity has to have a unique name, the method make_unique_entity( ) is called. It not only ensures that a unique name is generated with the method make_unique_name( ), but also that this name is unique in a tadir database table. For this purpose, it repeatedly calls a add_hash_to_shortend_name( ) method to create a new hash value at the end of the name until the name becomes unique in tadir and in the previously generated unique name table.

In the method make_unique_name( ), the possible prefix is combined with the name. If the name is longer than the maximal allowed 30-characters, the name is shortened and gc_hash_length letters of the hash of the name are added with an underscore to its end. As long as the name already exists in a given table of previously created names, the name is shortened if necessary, and gc_hash_length letters of the altered name's hash are added to the end again.

Returning to the method extract_message( ), the handle method is created similarly in the method determine_method_name( ). Here, the name gets converted to lower case, and the prefix handle is added, before the uniqueness is enforced. Analog, the name for the event interface and local class is generated. Afterwards, the generated names are stored in the event types table as well as the event type and abstract entity name.

For the abstract entity, the generation order is important to ensure that all dependencies have been created beforehand. It is calculated as the negative number of existing abstract entities in the abstract entity table. With this value, the abstract entity is added to the abstract entity table.

For the abstract behavior definitions, the generation order is not important as the behavior definition will be considered as a complete object in total. Nevertheless, the generation order may still be considered in order to map the hierarchy of the corresponding abstract entities. The combination of abstract entity and the associated behavior definition enables the ABAP runtime to define and reference deep structures. Therefore, the keyword TYPE STRUCTURE FOR HIERARCHY may be introduced to the ABAP language to let the EEE provide a typed event interface for the consumer.

Finally, the message properties are converted to elements in the method extract_elements( ). For each property, the type is checked and handled accordingly. At the end, it is added to the returning element table.

If an element is a primitive, it is extracted in the method extract_primitive_element( ). There, the unique name is determined with the method determine_element_name( ) analog to previously explained name generations. The field content is extracted with the method extract_primitive_data_type( ). In it, the type and format of the property are combined in an enum and together with their conversion to a matching xco-type returned.

In the case of a collection, it is split again if it is a complex collection or a primitive collection.

If it is a complex collection, the element is extracted from the property with the extract_complex_element (iv_is_collection=abap_true) method. In it, the XCO-format is created, checking if an abstract entity with that name already exists in the template. If one already exists, the existing one is used as the target. If it is a new entity, it is created and added to the abstract entities table. The elements of the newly created abstract entity are recursively transformed using the extract_elements( ) method. The unique element name is then determined in the method determine_element_name( ) analog to previously explained name generations. Finally, the XCO-format is created with a cardinality of 1-to-1. Since it is a collection, this created cardinality has to be overwritten with one of zero-to-n.

Primitive collections are extracted in the method extract_primitive_collection( ). Unlike the primitive data field, the collection requires a composition. This composition refers to a dedicated abstract entity, whose information is determined and extracted in the method extract_scalar_entity. Only in combination with the associated behavior definition the composition will be treated like an array-like field.

FIG. 28 shows a pre-conversion AsyncAPI JSON specification 2800 according to some embodiments. The specification 2800 defines channels, components, a payload, and message traits associated with an event. FIG. 29 show a post-conversion ABAP structure 2900 in accordance with some embodiments.

Example Event Implementation

Figure 30:
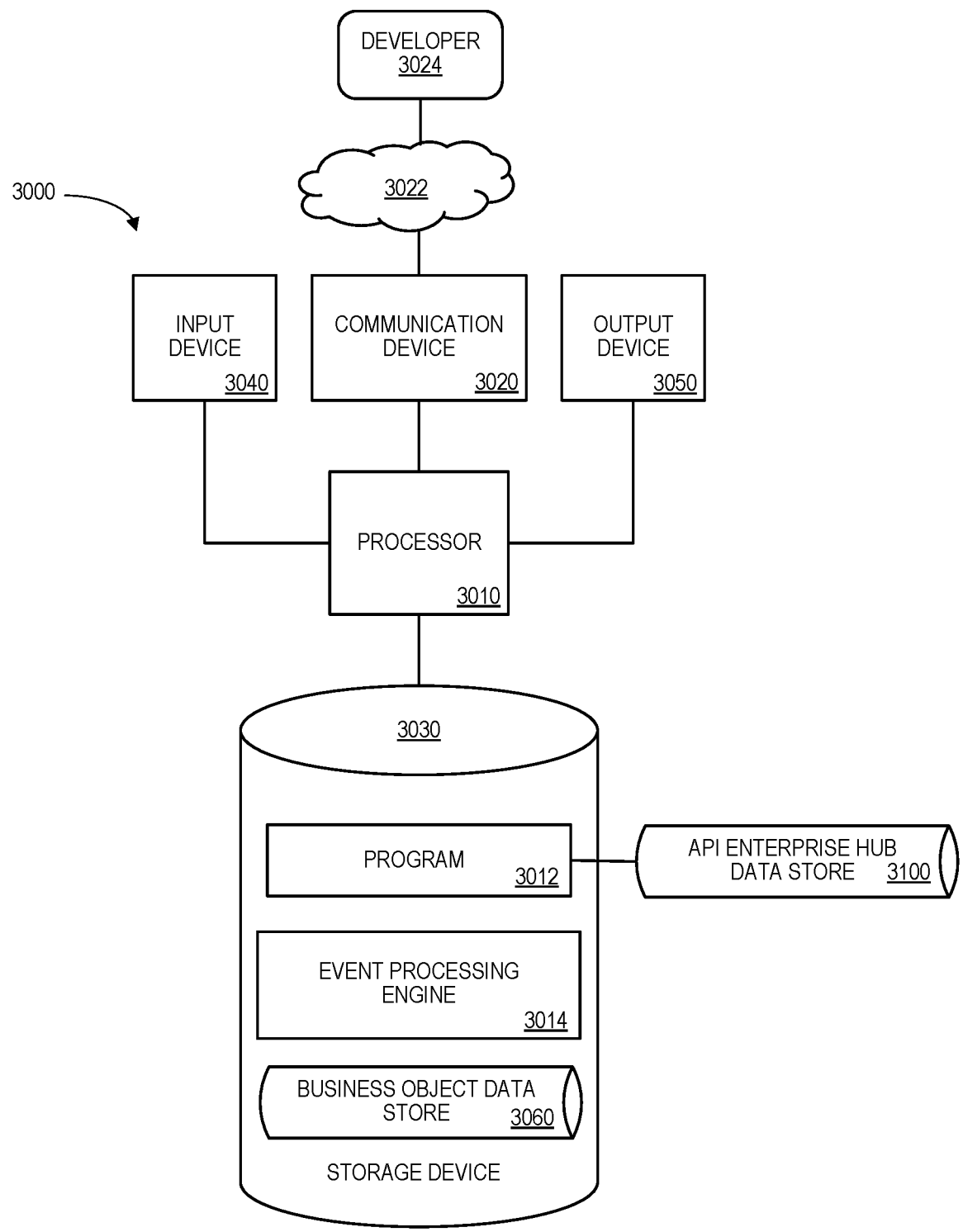
FIG. 30 is an apparatus or platform according to some embodiments.

Note that the embodiments described herein may be implemented using any number of different hardware configurations. For example, FIG. 30 is a block diagram of an apparatus or platform 3000 that may be, for example, associated with the systems 100, 300, 400 of FIGS. 1, 3, and 4, respectively (and/or any other system described herein). The platform 3000 comprises a processor 3010, such as one or more commercially available CPUs in the form of one-chip microprocessors, coupled to a communication device 3020 configured to communicate via a communication network (not shown in FIG. 30). The communication device 3020 may be used to communicate, for example, with one or more remote user platforms or a developer device 3024 via a communication network 3022. The platform 3000 further includes an input device 3040 (e.g., a computer mouse and/or keyboard to input data about an event mesh or data sources) and an output device 3050 (e.g., a computer monitor to render a display, transmit views and/or create monitoring reports). According to some embodiments, a mobile device and/or PC may be used to exchange data with the platform 3000.

The processor 3010 also communicates with a storage device 3030. The storage device 3030 can be implemented as a single database, or the different components of the storage device 3030 can be distributed using multiple databases (that is, different deployment data storage options are possible). The storage device 3030 may comprise any appropriate data storage device, including combinations of magnetic storage devices (e.g., a hard disk drive), optical storage devices, mobile telephones, and/or semiconductor memory devices. The storage device 3030 stores a program 3012 and/or an event processing engine 3014 for controlling the processor 3010. The processor 3010 performs instructions of the programs 3012, 3014, and thereby operates in accordance with any of the embodiments described herein. For example, the processor 3010 may facilitate event processing for an ABAP platform. The processor 3010 may automatically transform a behavior definition of a RAP model into a producer event via an event binding and a cloud event standardized format. Information about the producer event may then be passed to an ABAP application associated with a pre-configured destination at an enterprise business technology platform. In some embodiments, the processor 3010 may automatically parse the event specification and translate the parsed information into high-level programming language structures that reflect an event type at runtime. An event consumption model may then be generated by the processor 3010 based on the event type.

The programs 3012, 3014 may be stored in a compressed, uncompiled and/or encrypted format. The programs 3012, 3014 may furthermore include other program elements, such as an operating system, clipboard application, a database management system, and/or device drivers used by the processor 3010 to interface with peripheral devices.

As used herein, data may be "received" by or "transmitted" to, for example: (i) the platform 3000 from another device; or (ii) a software application or module within the platform 3000 from another software application, module, or any other source.

In some embodiments (such as the one shown in FIG. 30), the storage device 3030 further a business object data store 3060. Moreover, in some embodiments the program 3012 may access a standalone API enterprise hub data store 3100 that contains information about specifications. An example of a database that may be used in connection with the platform 3000 will now be described in detail with respect to FIG. 31. Note that the database described herein is only one example, and additional and/or different data may be stored therein. Moreover, various databases might be split or combined in accordance with any of the embodiments described herein.

Figure 31:
FIG. 31 illustrates an API enterprise hub data store in accordance with some embodiments.

Referring to FIG. 31, a table is shown that represents the API enterprise hub data store 3100 that may be associated with the platform 3000 according to some embodiments. The table may include, for example, entries identifying AsyncAPI specifications in connection with a cloud or on-premise computing environment. The table may also define fields 3102, 3104, 3106, 3108 for each of the entries. The fields 3102, 3104, 3106, 3108 may, according to some embodiments, specify a specification identifier 3102, event handler custom code 3104, a communication scenario 3106, and event consumption model identifier 3108. The API enterprise hub data store 3100 may be created and updated, for example, when a new specification is received, when a new model is generated, etc.

The specification identifier 3102 might be a unique alphanumeric label or link that is associated with an AsyncAPI events specification (e.g., available via a standalone enterprise hub) and may, according to some embodiments, include a version number. The event handler custom code 3104 may provide an event API for an EEE framework. The communication scenario 3106 may be associated with ABAP development tool cloud communication management and/or an inbound service of the event consumption model. The event consumption model identifier 3108 may represent an automatically created model for an ABAP platform application.

Figure 32:
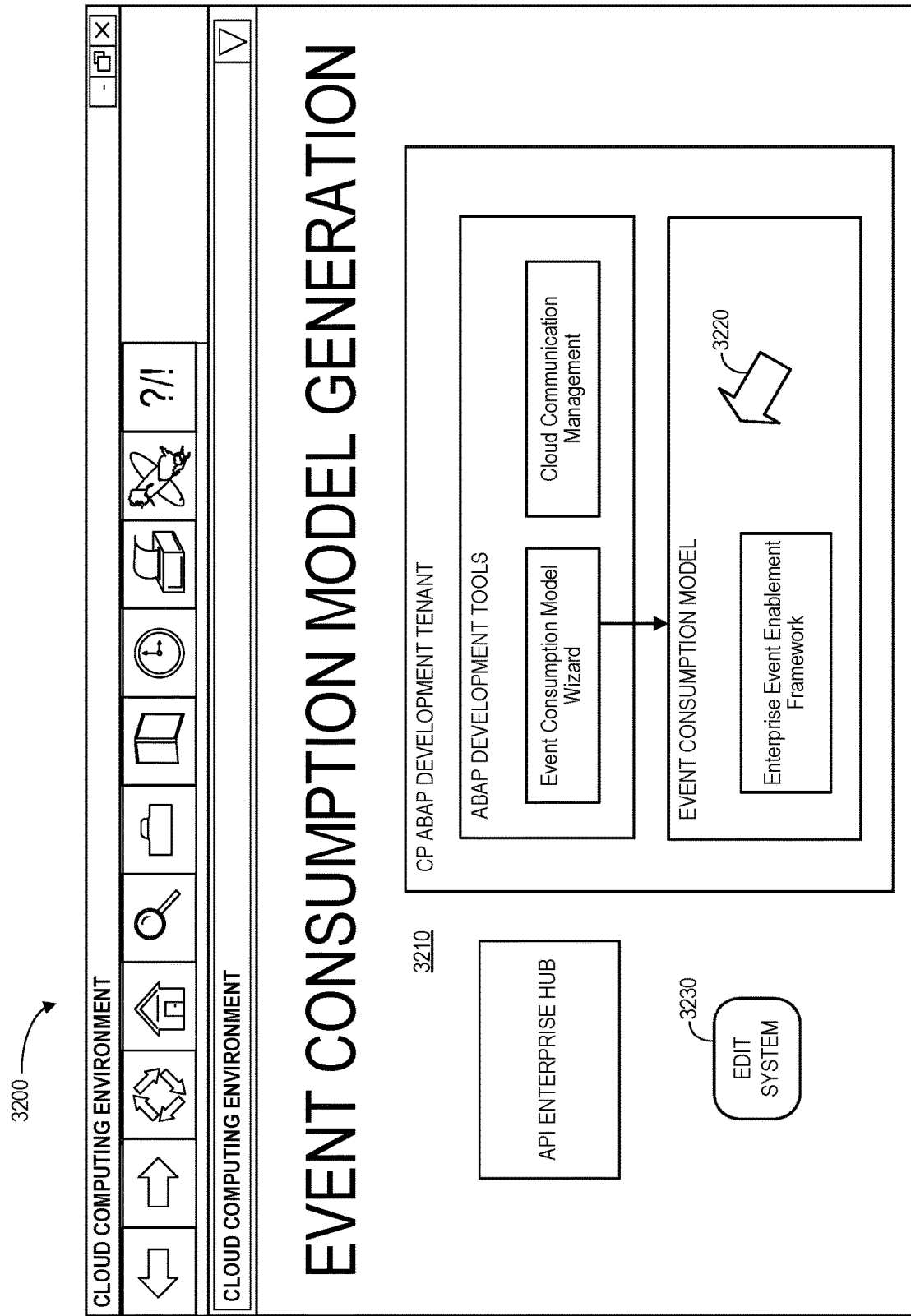
FIG. 32 is a human machine interface display in accordance with some embodiments.

FIG. 32 is a human-machine interface display 3200 in accordance with some embodiments. The display 3200 includes a graphical representation 3210 or dashboard that might be used to manage or monitor event consumption model generation (e.g., associated with a cloud provider). In particular, selection of an element (e.g., via a touchscreen or computer mouse pointer 3220) might result in the display of a popup window that contains configuration data. The display 3200 may also include a user selectable "Edit System" icon 3230 that a developer may use to request system changes (e.g., to investigate or improve system performance).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 33:
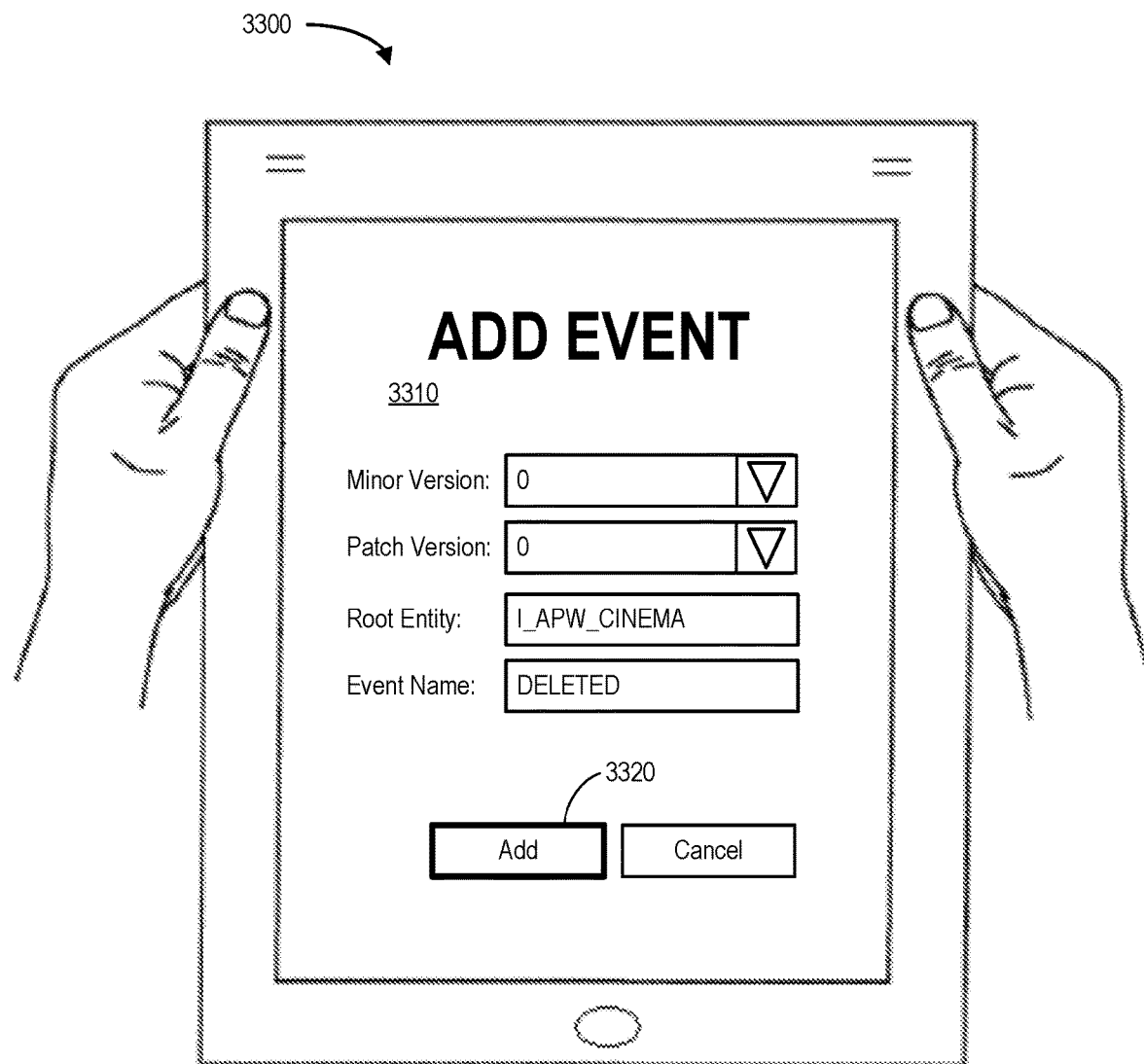
FIG. 33 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of events and specifications, any of the embodiments described herein could be applied to other types of events or specifications. Moreover, the displays shown herein are provided only as examples, and any other type of user interface could be implemented. For example, FIG. 33 shows a handheld tablet computer 3300 rendering an add event display 3310 that may be used to view or adjust a new event for an ABAP platform (e.g., via an "Add" icon 3320) and/or to request additional data about the system configuration.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate event processing for a high-level programing language platform, comprising:
a business object data store containing electronic records that include a Representational State Transfer ("REST")ful Application Programming ("RAP") model for a business object, wherein the RAP model has a behavior definition; and
an Enterprise Event Enablement ("EEE") framework coupled to the business object data store, including:
a computer processor, and
a memory storage device, coupled to the computer processor, including instructions that, when executed by the computer processor, enable the EEE framework to:
(i) access, from the business object data store, the behavior definition of the RAP model for the business object,
(ii) automatically transform the behavior definition of the RAP model into a producer event via an event binding, specifying an event type, and a cloud event standardized format, and
(iii) pass information about the producer event to a high-level programming language application associated with a pre-configured destination at an enterprise business technology platform;
wherein information from the event binding is passed to an Application Programming Interface ("API") of the EEE framework and the enterprise business technology platform, the API defining metadata and a description of a payload structure for the event type.

2. The system of claim 1, wherein the high-level programming language comprises an Advanced Enterprise application Programming ("ABAP") language.

3. The system of claim 2, wherein the event binding is associated with an event name, an event business object, and an event operation.

4. The system of claim 3, wherein a specific RAP event is assigned to the event type including a RAP business entity and the event name.

5. The system of claim 2, wherein the ABAP language platform is responsible for an exchange of events with an event mesh and external applications.

6. The system of claim 5, wherein each existing channel configuration and outbound binding containing a changed event producer are checked for validity.

7. A computer-implemented method to facilitate event processing for a high-level programing language platform, comprising:
accessing, by an Enterprise Event Enablement ("EEE") framework, a behavior definition of a Representational State Transfer ("REST")ful Application Programming ("RAP") model for a business object, wherein a business object data store contains electronic records that include a RAP model for a business object, wherein the RAP model has a behavior definition;
automatically transforming the behavior definition of the RAP model into a producer event via an event binding, specifying an event type, and a cloud event standardized format; and
passing information about the producer event to a high-level programming language application associated with a pre-configured destination at an enterprise business technology platform;
wherein information from the event binding is passed to an Application Programming Interface ("API") of the EEE framework and the enterprise business technology platform, the API defining metadata and a description of a payload structure for the event type.

8. The method of claim 7, wherein the high-level programming language comprises an Advanced Enterprise application Programming ("ABAP") language.

9. The method of claim 8, wherein the event binding is associated with an event name, an event business object, and an event operation.

10. The method of claim 9, wherein a specific RAP event is assigned to the event type including a RAP business entity and the event name.

11. A non-transitory, computer readable medium having executable instructions stored therein to perform a method to facilitate event processing for a high-level programing language platform, the method comprising:
   accessing, by an Enterprise Event Enablement ("EEE") framework, a behavior definition of a Representational State Transfer ("REST")ful Application Programming ("RAP") model for a business object, wherein a business object data store contains electronic records that include a RAP model for a business object, wherein the RAP model has a behavior definition;
   automatically transforming the behavior definition of the RAP model into a producer event via an event binding, specifying an event type, and a cloud event standardized format; and
   passing information about the producer event to a high-level programming language application associated with a pre-configured destination at an enterprise business technology platform;
   wherein information from the event binding is passed to an Application Programming Interface ("API") of the EEE framework and the enterprise business technology platform, the API defining metadata and a description of a payload structure for the event type.

12. The medium of claim 11, wherein the high-level programming language comprises an Advanced Enterprise application Programming ("ABAP") language.

13. The medium of claim 12, wherein the ABAP language platform is responsible for an exchange of events with an event mesh and external applications.

14. The medium of claim 13, wherein each existing channel configuration and outbound binding containing a changed event producer are checked for validity.

15. A system to facilitate event processing for a high-level programing language platform, comprising:
   a business object data store containing electronic records that include a Representational State Transfer ("REST")ful Application Programming ("RAP") model for a business object, wherein the RAP model has a behavior definition; and
   an Enterprise Event Enablement ("EEE") framework coupled to the business object data store, including:
   a computer processor, and
   a memory storage device, coupled to the computer processor, including instructions that, when executed by the computer processor, enable the EEE framework to:
      (i) access, from the business object data store, the behavior definition of the RAP model for the business object,
      (ii) automatically transform the behavior definition of the RAP model into a producer event via an event binding and a cloud event standardized format, and
      (iii) pass information about the producer event to a high-level programming language application associated with a pre-configured destination at an enterprise business technology platform;
   wherein a configuration of the EEE framework is updated to reflect a new event type when an additional event is appended to the business object, and the EEE framework invalidates a metadata cache and recalculates event types for a particular event producer when notified of a change.

16. The system of claim 15, wherein the high-level programming language comprises an Advanced Enterprise application Programming ("ABAP") language.

17. The system of claim 16, wherein an event type is specified within the event binding and the event binding is associated with an event name, an event business object, and an event operation.

18. The system of claim 17, wherein a specific RAP event is assigned to the event type including a RAP business entity and the event name.

19. The system of claim 18, wherein information from the event binding is passed to an Application Programming Interface ("API") associated with the EEE framework and the enterprise business technology platform, and the API defines metadata and a description of a payload structure for the event type.

20. The system of claim 16, wherein the ABAP language platform is responsible for an exchange of events with an event mesh and external applications and each existing channel configuration and outbound binding containing a changed event producer are checked for validity.

21. A computer-implemented method to facilitate event processing for a high-level programing language platform, comprising:
   accessing, by an Enterprise Event Enablement ("EEE") framework, a behavior definition of a Representational State Transfer ("REST")ful Application Programming ("RAP") model for a business object, wherein a business object data store contains electronic records that include a RAP model for a business object, wherein the RAP model has a behavior definition;
   automatically transforming the behavior definition of the RAP model into a producer event via an event binding and a cloud event standardized format; and
   passing information about the producer event to a high-level programming language application associated with a pre-configured destination at an enterprise business technology platform;
   wherein a configuration of the EEE framework is updated to reflect a new event type when an additional event is appended to the business object, and the EEE framework invalidates a metadata cache and recalculates event types for a particular event producer when notified of a change.

22. The method of claim 21, wherein the high-level programming language comprises an Advanced Enterprise application Programming ("ABAP") language.

23. The method of claim 22, wherein an event type is specified within the event binding and the event binding is associated with an event name, an event business object, and an event operation.

24. The method of claim 23, wherein a specific RAP event is assigned to the event type including a RAP business entity and the event name.

25. A non-transitory, computer readable medium having executable instructions stored therein to perform a method to facilitate event processing for a high-level programing language platform, the method comprising:
   accessing, by an Enterprise Event Enablement ("EEE") framework, a behavior definition of a Representational State Transfer ("REST")ful Application Programming ("RAP") model for a business object, wherein a business object data store contains electronic records that include a RAP model for a business object, wherein the RAP model has a behavior definition;
automatically transforming the behavior definition of the RAP model into a producer event via an event binding and a cloud event standardized format; and
passing information about the producer event to a high-level programming language application associated with a pre-configured destination at an enterprise business technology platform;
wherein a configuration of the EEE framework is updated to reflect a new event type when an additional event is appended to the business object, and the EEE framework invalidates a metadata cache and recalculates event types for a particular event producer when notified of a change.

26. The medium of claim 25, wherein the high-level programming language comprises an Advanced Enterprise application Programming ("ABAP") language.

27. The medium of claim 26, wherein the ABAP language platform is responsible for an exchange of events with an event mesh and external applications and each existing channel configuration and outbound binding containing a changed event producer are checked for validity.

* * * * *